US009967757B2

(12) United States Patent
Tehrani et al.

(10) Patent No.: US 9,967,757 B2
(45) Date of Patent: May 8, 2018

(54) SYSTEMS METHODS AND APPARATUSES FOR IMPLEMENTING DISTRIBUTED WIRELESS DATA SHARING AND CONTROL SYSTEMS

(71) Applicant: Adaptive Spectrum and Signal Alignment, Inc., Redwood City, CA (US)

(72) Inventors: Ardavan Maleki Tehrani, Menlo Park, CA (US); Kenneth J. Kerpez, Long Valley, NJ (US); Mung Chiang, Princeton, NJ (US)

(*) Notice: Subject to any disclaimer, the term of this patent is extended or adjusted under 35 U.S.C. 154(b) by 0 days. days.

(21) Appl. No.: 15/104,222

(22) PCT Filed: Dec. 17, 2013

(86) PCT No.: PCT/US2013/075874
§ 371 (c)(1),
(2) Date: Jun. 13, 2016

(87) PCT Pub. No.: WO2015/094197
PCT Pub. Date: Jun. 25, 2015

(65) Prior Publication Data
US 2016/0309345 A1    Oct. 20, 2016

(51) Int. Cl.
*H04M 3/00* (2006.01)
*H04W 24/02* (2009.01)
(Continued)

(52) U.S. Cl.
CPC ........... *H04W 24/02* (2013.01); *H04W 16/10* (2013.01); *H04W 24/04* (2013.01);
(Continued)

(58) Field of Classification Search
CPC . H04W 24/02; H04W 24/04; H04W 72/0426; H04W 28/0236; H04W 28/08; H04W 16/10
See application file for complete search history.

(56) References Cited

U.S. PATENT DOCUMENTS

| 8,179,848 B2 * | 5/2012 | Alay | H04B 5/02 370/328 |
|---|---|---|---|
| 8,942,714 B2 * | 1/2015 | Park | H04W 52/143 455/452.1 |

(Continued)

OTHER PUBLICATIONS

International Search Report and Written Opinion for International Patent Appication No. PCT/US13/75874 dated Nov. 28, 2014, 16 pages.

(Continued)

*Primary Examiner* — Wayne H Cai
(74) *Attorney, Agent, or Firm* — North Weber & Baugh LLP

(57) ABSTRACT

In accordance with embodiments disclosed herein, there are provided apparatus, systems and methods for implementing distributed wireless data sharing and control systems. Methodologies may include, for example, means for performing operations at a first wireless node having at least a processor and a memory therein, in which such operations include collecting measurements of a wireless environment at the first wireless node; determining a current configuration of the first wireless node; receiving state information from a second wireless node, in which the received state information describes a configuration of the second wireless node and further describes collected measurements of a wireless environment at the second wireless node; with the operations further including analyzing the collected measurements of the wireless environment at the first wireless node and also analyzing the state information received from the (Continued)

second wireless node, the analysis being used to determine one or more modifications to the current configuration of the first wireless node; adopting a modified configuration at the first wireless node by updating the current configuration of the first wireless node with the determined one or more modifications; and communicating first node state information to the second wireless node, in which the first node state information describes the modified configuration adopted by the first wireless node and the collected measurements of the wireless environment at the first wireless node. Other related embodiments are disclosed.

36 Claims, 9 Drawing Sheets

(51) Int. Cl.
*H04W 72/04* (2009.01)
*H04W 24/04* (2009.01)
*H04W 28/02* (2009.01)
*H04W 28/08* (2009.01)
*H04W 16/10* (2009.01)

(52) U.S. Cl.
CPC ....... *H04W 28/0236* (2013.01); *H04W 28/08* (2013.01); *H04W 72/0426* (2013.01)

(56) References Cited

U.S. PATENT DOCUMENTS

| | | | |
|---|---|---|---|
| 9,407,557 B2* | 8/2016 | Wadkins | ............... H04L 69/163 |
| 9,554,365 B2* | 1/2017 | Falconetti | ............. H04L 5/0053 |
| 2004/0053624 A1* | 3/2004 | Frank | ...................... H04L 47/14 |
| | | | 455/453 |
| 2008/0233967 A1 | 9/2008 | Montojo et al. | |
| 2008/0247375 A1 | 10/2008 | Muharemovic et al. | |
| 2010/0267408 A1 | 10/2010 | Lee et al. | |
| 2012/0172054 A1* | 7/2012 | Waters | .................... G01S 19/46 |
| | | | 455/456.1 |
| 2013/0203428 A1 | 8/2013 | Hwang | |

OTHER PUBLICATIONS

Office Action dated Oct. 18, 2017, in European Patent Application No. 13821031.5 (4pgs).

* cited by examiner

Flat

Hierarchical

| Initial data. Interference is locally measured as the level into this AP. Blank entries are unknown. | | | | | | | | | | | |
|---|---|---|---|---|---|---|---|---|---|---|---|
| AP1's data | | | AP2's data | | | AP3's data | | | AP4's data | | |
| AP | CH | RFI | AP | CH | RFI | AP | CH | RFI | AP | CH | RFI |
| 1 | 6 | NA | 1 | | High | 1 | | High | 1 | | Low |
| 2 | | High | 2 | 6 | NA | 2 | | High | 2 | | High |
| 3 | | High | 3 | | High | 3 | 6 | NA | 3 | | High |
| 4 | | Low | 4 | | High | 4 | | High | 4 | 6 | NA |

AP1 sends its information to AP2. AP2 changes to channel 1. The APs measure interference.

| AP1's data | | | AP2's data | | | AP3's data | | | AP4's data | | |
|---|---|---|---|---|---|---|---|---|---|---|---|
| AP | CH | RFI | AP | CH | RFI | AP | CH | RFI | AP | CH | RFI |
| 1 | 6 | NA | 1 | 6 | High | 1 | | High | 1 | | Low |
| 2 | | Low | 2 | 1 | NA | 2 | | Low | 2 | | Low |
| 3 | | High | 3 | | High | 3 | 6 | NA | 3 | | High |
| 4 | | Low | 4 | | High | 4 | | High | 4 | 6 | NA |

AP2 sends its information to AP3. AP3 changes to channel 11. The APs measure interference.

| AP1's data | | | AP2's data | | | AP3's data | | | AP4's data | | |
|---|---|---|---|---|---|---|---|---|---|---|---|
| AP | CH | RFI | AP | CH | RFI | AP | CH | RFI | AP | CH | RFI |
| 1 | 6 | NA | 1 | 6 | Low | 1 | 6 | Low | 1 | | Low |
| 2 | | Low | 2 | 1 | NA | 2 | 1 | Low | 2 | | Low |
| 3 | | Low | 3 | | Low | 3 | 11 | NA | 3 | | Low |
| 4 | | Low | 4 | | Low | 4 | | Low | 4 | 6 | NA |

The APs continue to exchange information, but since all interference is low they don't change channel until a new external event occurs. After more iterations, the data is distributed as below:

| AP1's data | | | AP2's data | | | AP3's data | | | AP4's data | | |
|---|---|---|---|---|---|---|---|---|---|---|---|
| AP | Chan. | RFI | AP | Chan. | RFI | AP | Chan. | RFI | AP | Chan. | RFI |
| 1 | 6 | NA | 1 | 6 | Low | 1 | 6 | Low | 1 | 6 | Low |
| 2 | 1 | Low | 2 | 1 | NA | 2 | 1 | Low | 2 | 1 | Low |
| 3 | 11 | Low | 3 | 11 | Low | 3 | 11 | NA | 3 | 11 | Low |
| 4 | 6 | Low | 4 | 6 | Low | 4 | 6 | Low | 4 | 6 | NA |

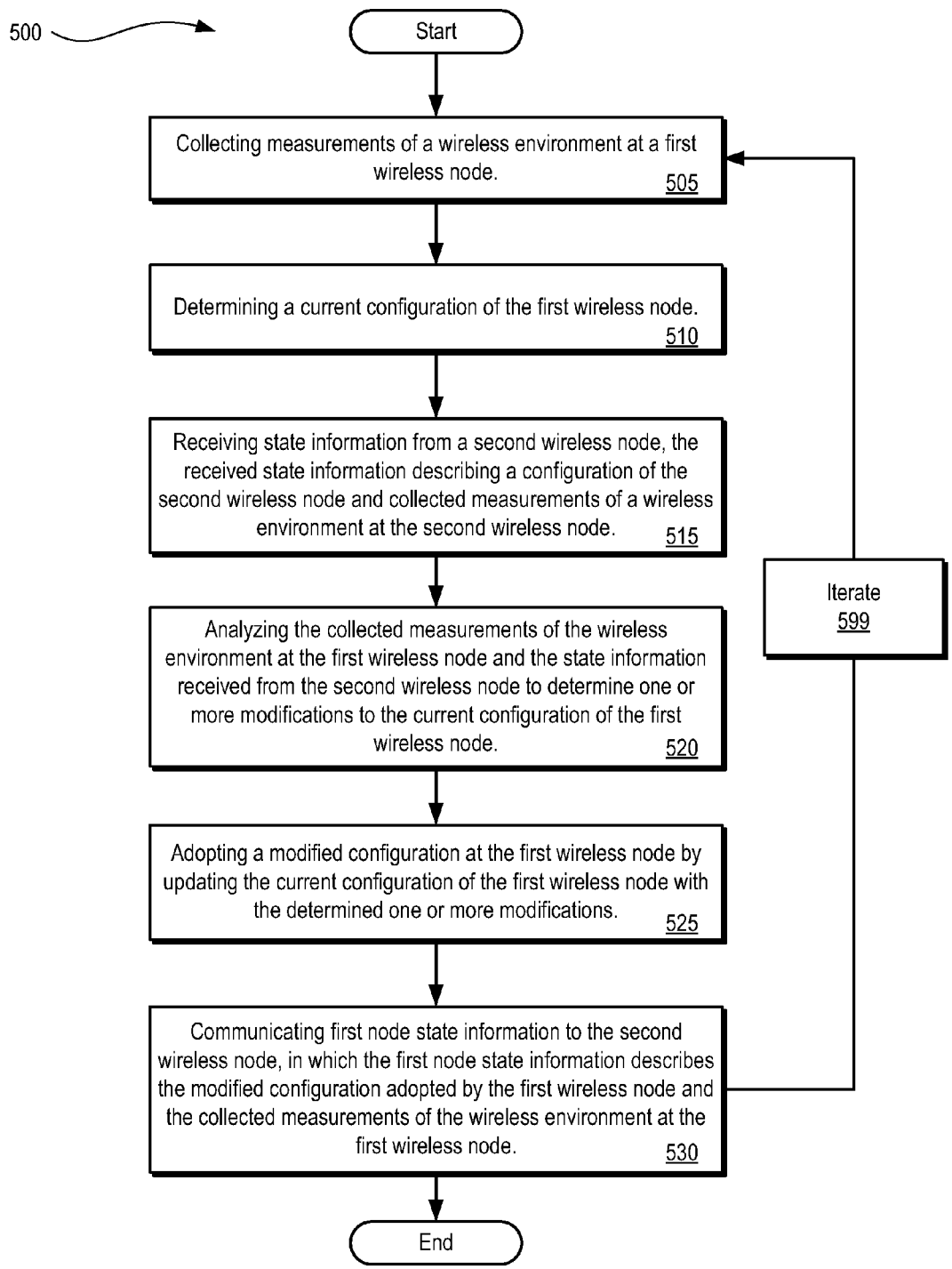

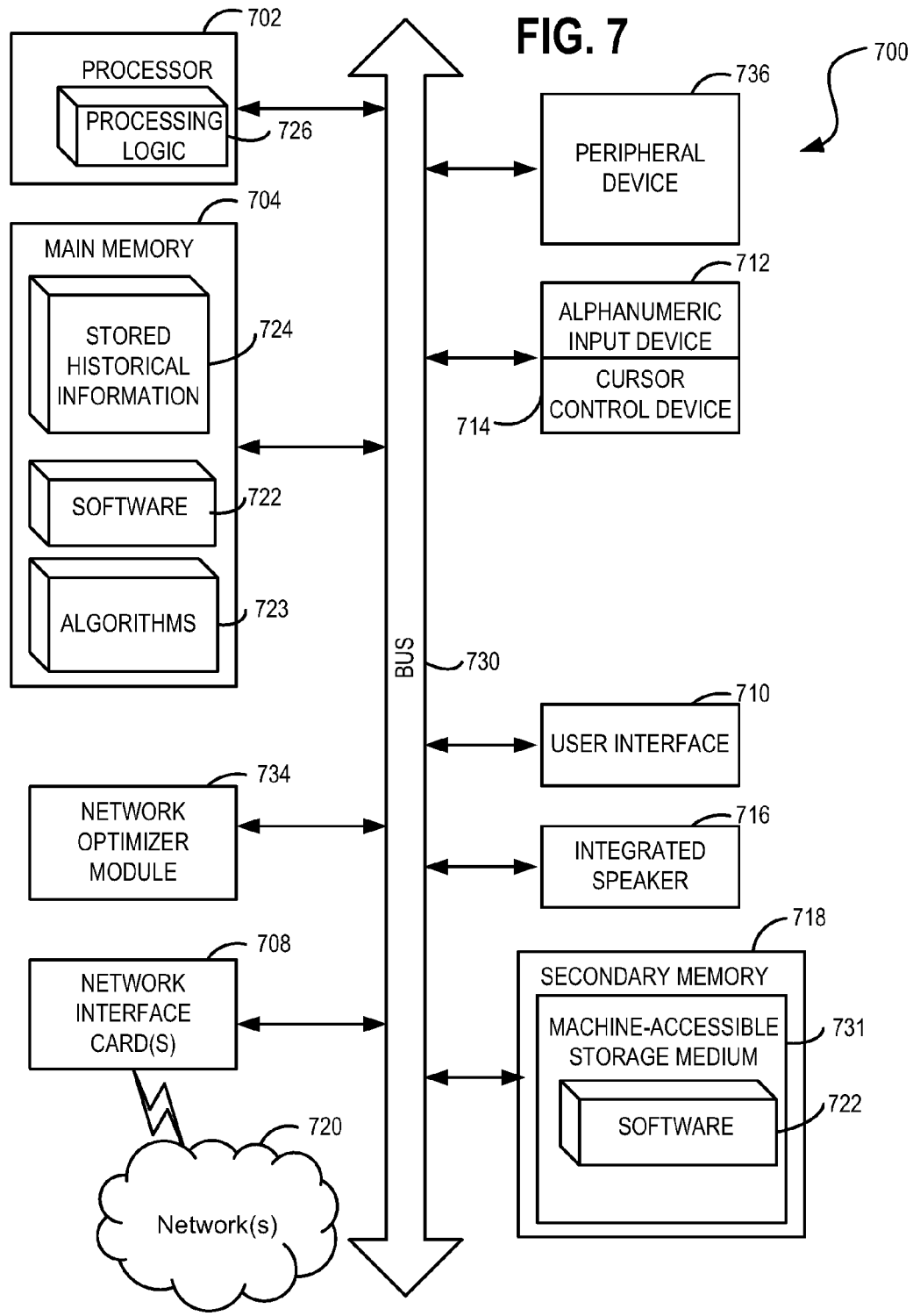

SYSTEMS METHODS AND APPARATUSES FOR IMPLEMENTING DISTRIBUTED WIRELESS DATA SHARING AND CONTROL SYSTEMS

CLAIM OF PRIORITY

This application is a National Phase Application of, and claims priority to, PCT Application No. PCT/US13/75874, filed on 17 Dec. 2013, titled "SYSTEMS METHODS AND APPARATUSES FOR IMPLEMENTING DISTRIBUTED WIRELESS DATA SHARING AND CONTROL SYSTEMS," which is incorporated by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems methods and apparatuses for implementing distributed wireless data sharing and control systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In computer networking, a wireless access point (WAP) is a device that allows wireless devices to connect to a wired network or other wireless devices using Wi-Fi, Bluetooth or other related standards. The wireless access point commonly connects to a router or operates as a router itself. A wireless access point (WAP) is sometimes referred to as an Access Point (AP), or a wireless node AP.

Wireless access points are commonplace; however, conventional offerings of such wireless access points fail to operate in the most efficient manner possible, and may be improved upon in a multitude of ways. In particular, wireless access points that operate within close proximity with one another often interfere with each other degrading the performance of such wireless access points and hampering the ability of wireless stations in the area to communicate with them.

While it may be theoretically possible to upgrade the billions of wireless stations which request access to such wireless node access points, it would not be possible in practice. Rather, legacy support for older wireless stations is a practical requirement for any proposed operational change to wireless communications. Improving the operations of the WAPs to which such wireless stations connect is more likely to result in faster and broader adoption of improved wireless communication technologies.

The present state of the art may therefore benefit from systems methods and apparatuses for implementing distributed wireless data sharing and control systems as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 4B provides a table depicting the operational details of the exemplary embodiment depicted by the method of FIG. 4A;

FIG. 5 is a more detailed flow diagram illustrating a method for implementing distributed wireless data sharing and control systems in accordance with described embodiments;

FIG. 7 illustrates a diagrammatic representation of a machine in the exemplary form of a computer system, in accordance with one embodiment.

DETAILED DESCRIPTION

Figure 1:
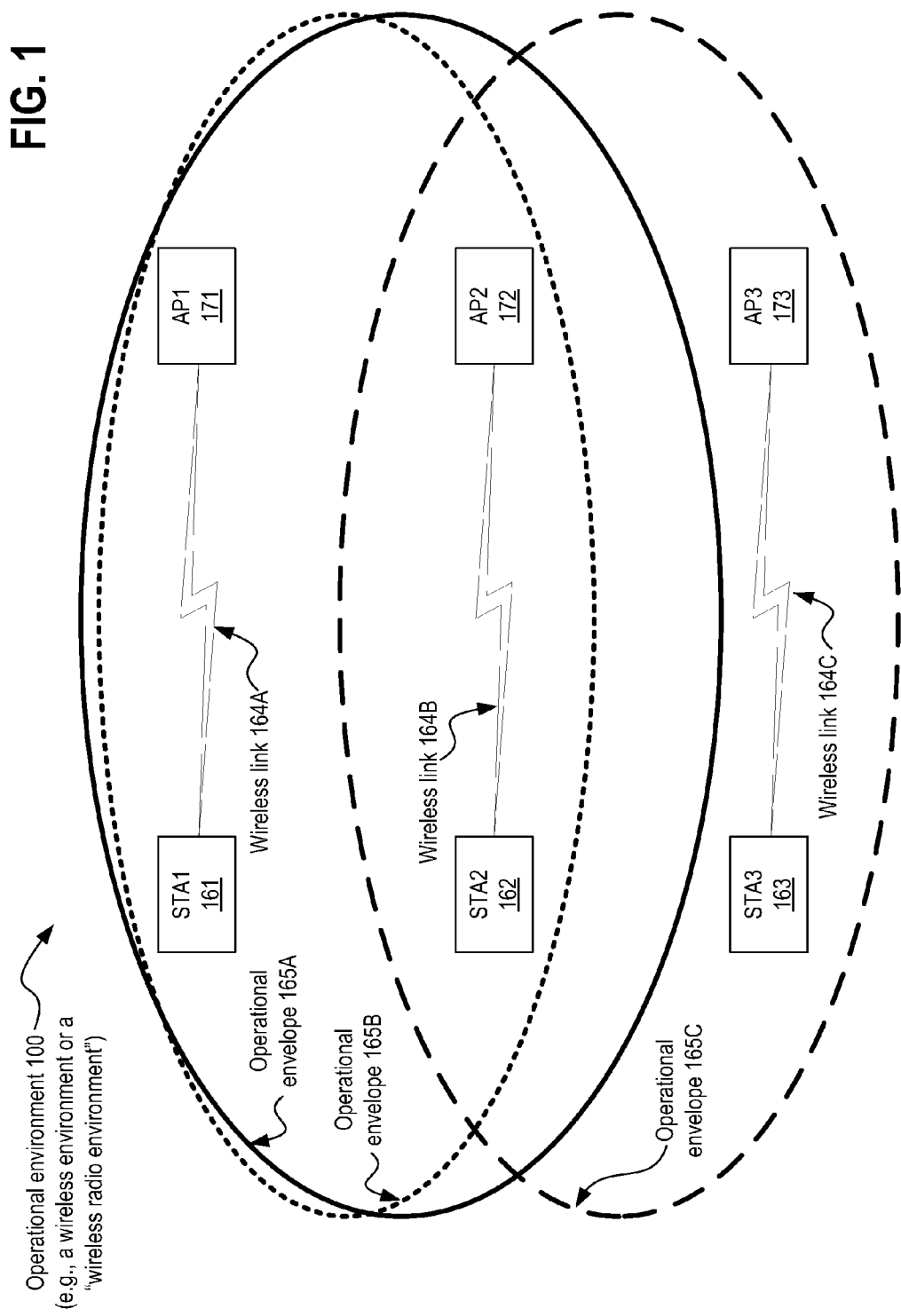
FIG. 1 illustrates an exemplary operational environment within which embodiments may operate.

Described herein are apparatus, systems and methods for implementing distributed wireless data sharing and control systems.

In accordance with described embodiments, means for implementing distributed wireless data sharing and control system may include: performing operations at a first wireless node having at least a processor and a memory therein, in which such operations include collecting measurements of a wireless environment at the first wireless node; determining a current configuration of the first wireless node; receiving state information from a second wireless node, in which the received state information describes a configuration of the second wireless node and further describes collected measurements of a wireless environment at the second wireless node; with the operations further including analyzing the collected measurements of the wireless environment at the first wireless node and also analyzing the state information received from the second wireless node, the analysis being used to determine one or more modifications to the current configuration of the first wireless node; adopting a modified configuration at the first wireless node by updating the current configuration of the first wireless node with the determined one or more modifications; and communicating first node state information to the second wireless node, in which the first node state information describes the modified configuration adopted by the first wireless node and the collected measurements of the wireless environment at the first wireless node.

In such embodiments, so called "state information" may include, for example, configuration parameters, measurements of the wireless radio environment within which a respective wireless node operates, as well as test, diagnostics, status, inventory, and performance monitoring parameters.

The state information communicated between such nodes may be utilized to quantify a change in performance of one of the wireless nodes such that improvements or additional efficiencies may be introduced to the configuration of one or more of the nodes to improve overall operational performance of a wireless network formed by such nodes. Quantifying a change in performance may include determining any of: (i) a change in configuration of the wireless node performing such analysis or a change in configuration at one or more interfering wireless nodes; (ii) a change in traffic levels of the wireless node or at one or more other wireless nodes; or (iii) a change in one or more performance metrics measured by a respective wireless node and represented within the shared state information amongst the various wireless nodes.

With large-scale WiFi network deployments at businesses, public spaces, municipal networks, etc., management has conventionally focused on baseline configuration and placement through a process sometimes known as provisioning. The provisioning process is labor intensive and primarily seeks to improve only the most obvious performance characteristics such as geographic coverage for the site in question and the ability to handle anticipated traffic load. Areas may be assessed based on Received Signal Strength Indicators (RSSI) and deployment of a new access point is considered when RSSI measurements fall below a desired threshold. Once in operation, if a particular access point is frequently overwhelmed by near-by user activities and is found to be operating at its maximum traffic load, then again, deployment of a new access point may be considered. Unfortunately, introduction of a new access point does not necessarily resolve the problem. Such an introduction may serve only to create additional interference providing no net gain or potentially, resulting in a performance degradation.

Moreover, once deployed, settings for the various access points provisioned to a given space usually remain static, until such time that a problem arises and new RSSI measurements are taken or an access point is reviewed for traffic load, which again requires a labor intensive process.

The most advanced access points presently available are capable of self adjusting certain configurations such as channel assignment, but these self adjustments are performed wholly in isolation within a given access point and make no assessment or consideration of other access points that are operating nearby, much less, how localized configuration changes may negatively or positively affect performance of other nearby access points. No overall joint model is provided for multiple access points and self adjustments are limited to very simplistic changes, such as modifying a channel assignment.

With residential WiFi access points, options for performance management are essentially non-existent, beyond a user guessing at improved physical placement options and attempting to blindly change settings without any feedback or diagnostics provided. Unsurprisingly, residential consumers are often frustrated and many simply accept less than optimal performance.

As the wireless arts continue to advance, WiFi connections for video service using 802.11n or 802.11ac enabled set-top boxes are beginning to be deployed by both telcos and cable companies. On the positive side, such wireless deployments do not require drilling holes or hooking wires. But detrimentally, such deployments work only in sparsely populated areas where there is very little interference. When deployed in more densely populated areas, such as within an apartment building, the devices function poorly resulting in many complaints and throughput is often insufficient to maintain the bandwidth necessary to communicate moving video wirelessly, especially high definition video.

With conventional wireless network implementations, the problem generally is not the ability to communicate via wireless links as such functionality is very well understood. Rather, the problem is to implement efficient communications within a wireless system having multiple wireless nodes, such as WiFi Access Points, each of which create electromagnetic interference to other wireless nodes.

Unlike cellular systems where location and non-interfering frequencies are carefully researched, planned, and assigned well in advance, and then finally provisioned to a cellular base station, the provisioning of WiFi base stations and access points result in a an often chaotic and less than optimal placement because very often it is not feasible in terms of time or cost to pre-plan the provisioning of a WiFi network, especially in ad-hoc or residential environments. Additionally, wireless nodes may belong to different owners and are therefore not known or accessible to any individual entity capable of carrying out such pre-planning. Yet further still, a situation may arise where a particular business or enterprise undertakes sophisticated pre-planning for the provisioning of wireless nodes, such as when establishing a campus WiFi network, only to have new unknown wireless nodes belonging to other individuals in close proximity transmitting conflicting wireless signals, thus resulting in unwanted interference despite the pre-planning efforts. Such unknown wireless nodes may be nearby businesses, neighboring residences, or individual persons with mobile wireless devices temporarily broadcasting conflicting signals, such as via a mobile "hotspot" which provides a temporary and highly mobile wireless node AP.

Systems have been made to coordinate the configuration of newly provisioned wireless nodes via a centralized server in which the centralized server pushes an appropriate configuration out to the wireless nodes. However, such a scheme requires communication back to the server responsible for conducting such a configuration push. Unfortunately, in ad-hoc environments there may not be a communications path back to a centralized server established, thus undermining such capability. Other reasons that WiFi networks may benefit from distributed control include situations where a centralized server is not available, regardless of whether a communication path exists, situations where configuring a centralized server would result in too much delay, concerns regarding the security and privacy of the wireless nodes being provisioned and a preference not to share their status and configuration details with a remote configuration server, and a desire for a more simplified set up of the wireless nodes without the complexity that a remote configuration server entails.

Still another approach for configuring a WiFi network is simply to provision the wireless nodes and hope for the best. However, blind ignorance relies upon chance to ensure that the provisioned wireless nodes are operating as efficiently as possible, which is highly unlikely to occur in any given deployment.

The described means for implementing distributed wireless data sharing and control systems overcomes many of the limitations of prior systems and methods. The described means may prove extremely useful to both commercial deployments as well as residential deployments, especially for those in congested areas such as within an urban environment and ad-hoc deployments such as at large outdoor venues including fairs and concerts or indoor venues such as conventions as the described means are capable of optimizing the operational characteristics for multiple such wireless node access points collectively through the collection, sharing, and analysis of state information.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary operational environment 100 within which embodiments may operate, such as the wireless environment or "wireless radio environment" within which the wireless node APs reside. In particular, there is depicted an operational environment 100 within which several access points AP1 171, AP2 172, and AP3 173 operate, as well as mobile stations STA1 161, STA2 162, and STA3 163. As shown, STA1 161 is communicatively interfaced via a wireless link 164A with AP1 171; STA2 162 is communicatively interfaced via a wireless link 164B with AP2 172; and STA3 163 is communicatively interfaced via a wireless link 164C with AP3 173.

More interestingly, however, is that multiple wireless node access points are present, and each establishes an operational envelope (165A, 165B, and 165C) within the wireless environment which provides wireless coverage to those mobile devices or stations that are within range, but also results in potentially detrimental interference to other access points.

For instance, AP1 171 results in wireless coverage via operational envelope 165A sufficient to support STA1 161 which is shown as connected via wireless link 164A but may result in unwanted interference to AP2 172 and STA2 162. AP2 172 provides wireless coverage via operational envelope 165B sufficient to support both STA1 161 and also STA2 162, but does not result, according to this exemplary depiction, in detrimental interference to AP3 173, yet is nevertheless subjected to interference from AP3 173 as well as AP1 171. AP3 173 on the other hand receives no interference from AP1 171 yet is subjected to interference from AP2 172. AP3 173 is communicatively interfaced with STA3 163 which resides within the operational envelope 165C wireless range of AP3 173.

Figure 2A:
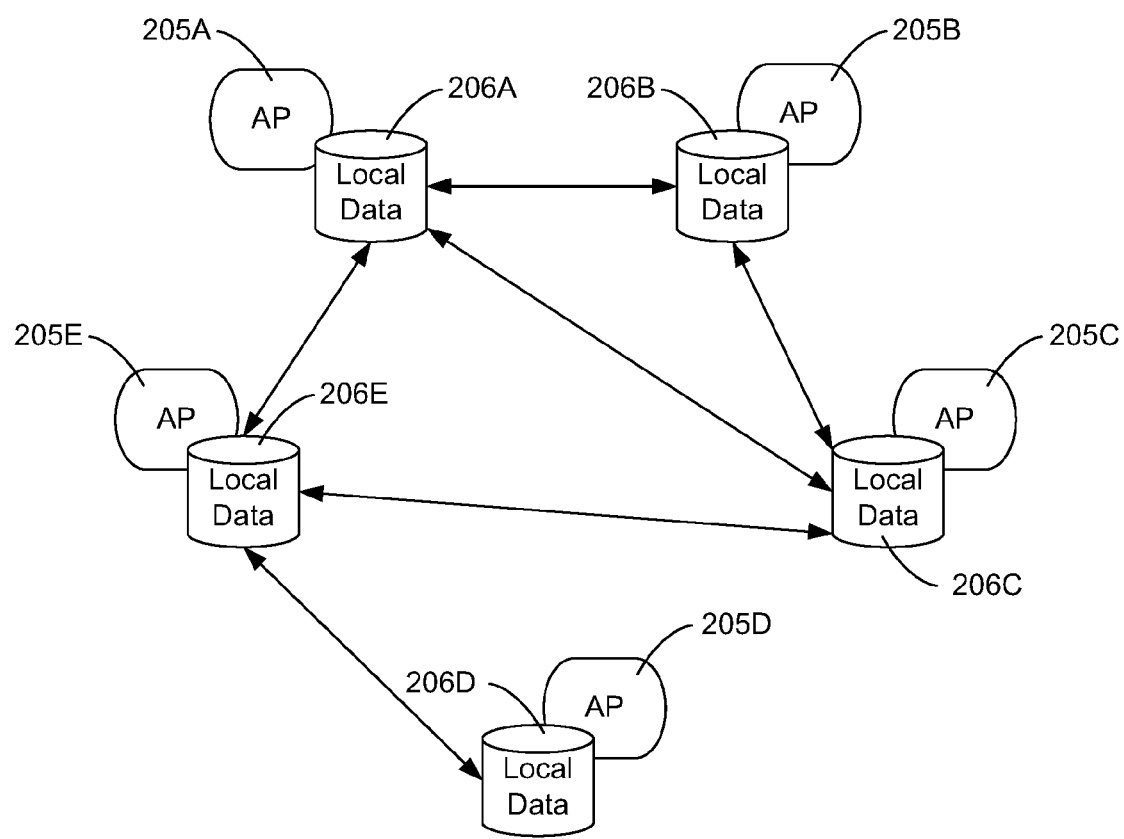
FIGS. 2A and 2B illustrate exemplary architectures within which embodiments may operate.
Figure 2B:
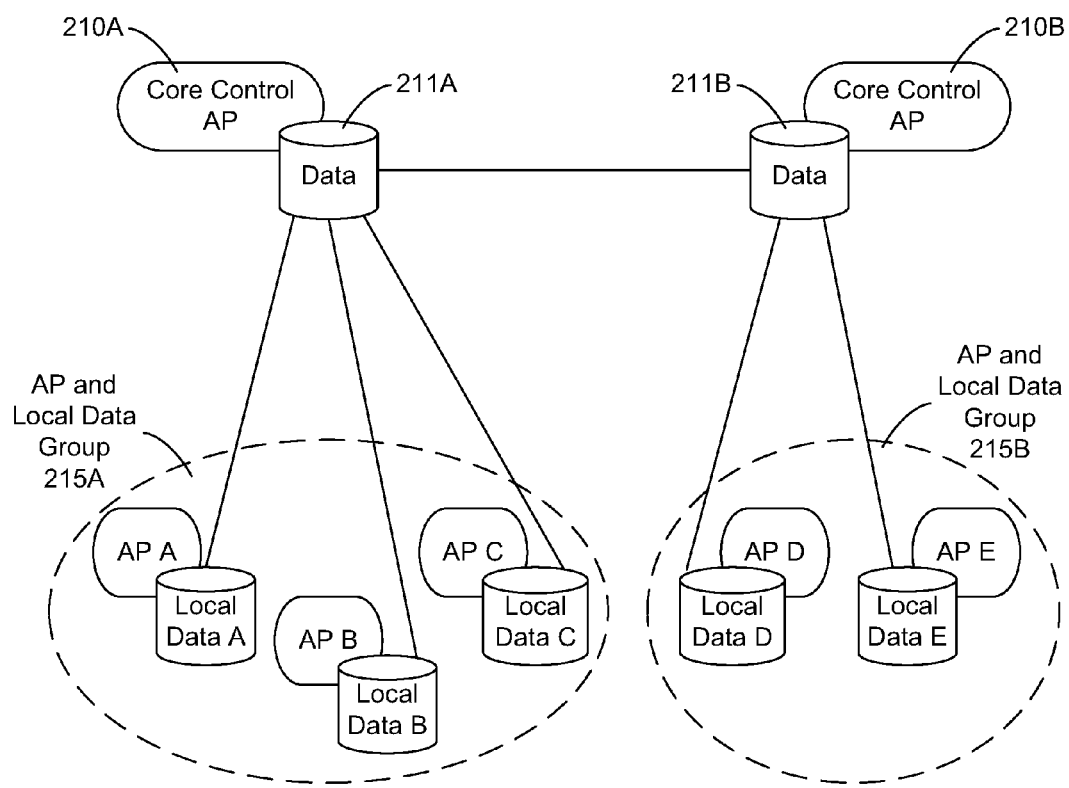

FIGS. 2A and 2B illustrate exemplary architectures within which embodiments may operate. In particular, there are depicted multiple Access Points (APs), each themselves being wireless nodes capable of carrying out the operations described herein. Additionally depicted are multiple data repositories, each affiliated with a given Access Point (AP) to store measurements collected by each wireless node AP and to also store state information received from other wireless node APs.

As shown at FIG. 2A, AP 205A is affiliated with local data 206A and is communicably interfaced with AP 205B, AP 205C, and AP 205E. APs 205B, 205C, and 205E are in turn affiliated with local data 206B, 206C, and 206E respectively. AP 205D affiliated with local data 206D and is indirectly interfaced to AP 205A through AP 205E where AP 205E serves as an intermediate node. Some of the APs have multiple potential paths to other nodes. For instance, AP 205C may reach AP 205A directly or may reach AP 205A indirectly through AP 205B or through AP 205E when APs 205B and 205E operate as intermediate nodes between APs 205A and 206C.

The APs 205A-E form a wireless network having a distributed wireless control system in which the multiple access points communicate with each other so that each respective AP 205A-E may perform and equal part of the distributed wireless control system's management to optimize the wireless configuration settings of the entire wireless network.

The distributed wireless control system at FIG. 2A is a fully distributed flat architecture without any hierarchy. Conversely, the logical architecture may be implemented as a hierarchical architecture as depicted at FIG. 2B in which APs are grouped, with some APs, such as those situated in desirable locations operating as core control APs, and other APs, such as those in less desirable locations communicating through the core control APs. Both versions are possible, with pros and cons for each case, in which the choice depends largely on the geographic span and the number of APs involved. Flat and hierarchical architectures for the distributed wireless control systems may also be used concurrently in different parts of a single system. With hierarchical architectures, different functions within the different wireless node APs may be employed. For instance, one may scan channel assignments and share its findings with the other nodes whereas another analyzes error data and traffic load data. In such a way, the overhead required to implement the system is reduced because data collection and distribution roles are permissibly broken up amongst the nodes. The fully distributed wireless control system of FIG. 2A conversely operates with all functions being equally implemented at all wireless node APs without any hierarchical relationships or division of processing loads.

As shown at FIG. 2B, there are two core control APs, core control AP 210A which is affiliated with data 211A and core control AP 210B affiliated with data 211B. Core control AP 210A supports and is communicably interfaced with the AP and local data group 215A having therein APs A, B, and C, each respectively affiliated with local data A, B, and C. Similarly, core control AP 210B supports and is communicably interfaced with the AP and local data group 215B having therein APs D and E, each respectively affiliated with local data D and E.

Regardless of whether a flat architecture as depicted by FIG. 2A or a hierarchical architecture as depicted by FIG. 2B is chosen, or some combination thereof at various parts of a single system, control, as well as computation and storage, is distributed across the multiple access points 205A-E and/or core control APs 210A and 210B as depicted at the respective figures.

Control messaging may be distributed among the multiple access points 205A-E using a mesh network over the air interface, or via a wired backbone network, or both. Wireless data sharing, discovery, analysis, and control may all be implemented and performed in a distributed manner by leveraging the various access points 205A-E which make up the wireless network.

Implementation of such a distributed wireless control system which distributes collaborative control capabilities amongst the multiple access points 205A-E is more robust and more effective in controlling network-wide configuration than a purely autonomous distributed system in which all access points control only their own respective configuration in isolation and therefore operate with ignorance to the actions of other such wireless node access points 205A-E within the same network.

A distributed wireless control system as described herein may include at least the two following components: firstly, a distributed data messaging and control-plane; and secondly, applications for the control plane. Unlike previously known distributed mesh or sensor networks for which both the control plane is distributed and the data plane is also distributed, the distributed wireless control system as described herein distributes control but need not distribute the data plane which may therefore be used in accordance with a centralized architecture such as a star topology.

The distributed wireless control system and its multiple wireless node access points 205A-E and/or core control APs 210A and 210B and AP groups 215A and 215B establish communications amongst one another in performing management optimizations with control being distributed across the multiple access points in a similar fashion to that of a mesh network, however, unlike a mesh network, such distribution operates only at the control plane and not at the data plane. Additionally, unlike a mesh network, control messages may be passed across a wired backbone network enabling more robust protocols for messaging and control, such as those which include acknowledgement messages ensuring cooperation among the multiple wireless node access points 205A-E and/or core control APs 210A and 210B and AP groups 215A and 215B of the network.

WiFi networks in particular are differentiated from cellular networks because WiFi generally is not controlled by centralized network management systems, whereas cellular networks are subject to centralized control. The distributed WiFi control system described here implements network management control by messaging the APs, across an Ethernet backhaul or radio interface, in accordance with the described embodiments. Such a scheme is very helpful within ad-hoc wireless environments such as deployments at a trade-show or stadium. In such scenarios the multiple APs are distributed chaotically with wireless transmission parameters being assigned poorly or possibly not at all, resulting in the default parameters being adopted. The described means for implementing distributed wireless data sharing and control systems can therefore greatly improve operational efficiency of such a wireless network by reducing unwanted interference affecting the various wireless nodes.

Figure 3:
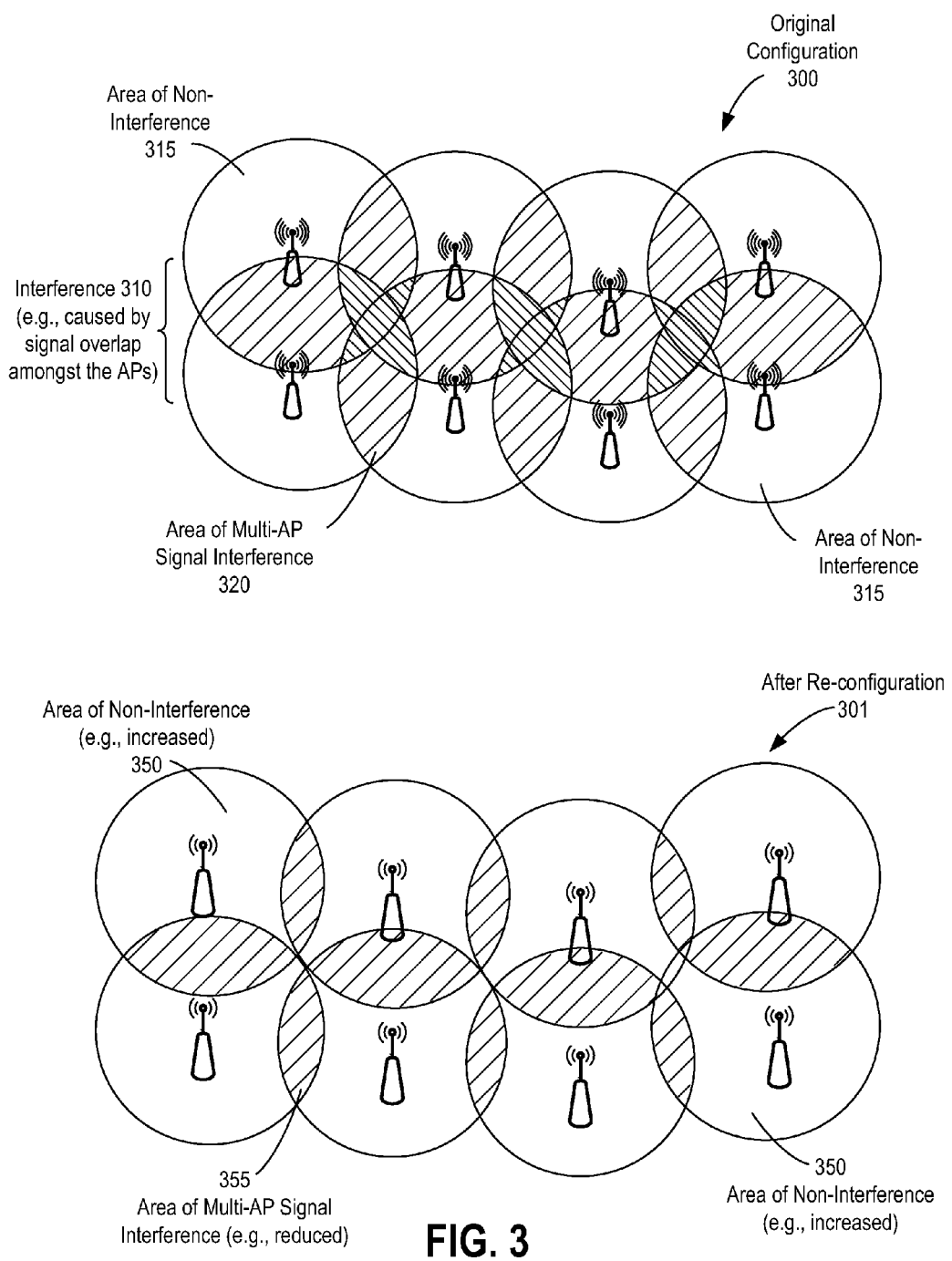
FIG. 3 illustrates additional exemplary operational environments within which embodiments may operate.

FIG. 3 illustrates additional exemplary operational environments within which embodiments may operate. On the top portion of FIG. 3 an original configuration 300 is depicted and on the bottom portion of the figure the identical wireless nodes corresponding to multiple access points are again depicted but after a re-configuration 301.

As can be seen with the original configuration 300, there are multiple areas of non-interference 315 for the respective wireless nodes, however, there are also significant areas of interference 310 caused by the signal overlap amongst the multiple APs as depicted by the lined portion within the space that any two or more circles intersect representing areas of multiple-AP signal interference 320. After re-configuration 301 there remains interference, however, the areas of non-interference 350 are increased and the areas of multiple-AP signal interference 355 are reduced. The wireless nodes depicted after re-configuration 301 are the same in number and physical location as in the original configuration 300 above them, however, the wireless nodes after-reconfiguration have been subjected to changes in their operational parameters thus reducing interference and optimizing the operational environment within which each wireless node operates, and thus also improving the ability for wireless stations (e.g., client devices) to connect and communicate with the respective wireless node APs depicted.

For example, it may be that the wireless nodes in the original configuration 300 broadcast at maximum transmit power, thus creating an unnecessarily large operational envelope leading to greater areas of signal interference between the respective wireless nodes. By assigning channels and varying transmit power to vary cell radii, overall network efficiency can be improved. For instance, after re-configuration 301, the assignment of different channels to adjacent or nearby wireless nodes reduces signal collisions and decreasing the transmit power for at least some of the wireless nodes decreases the radio coverage area thus reducing the extent of overlapping signals between two or more wireless access points and in turn reducing unwanted interference while still ensuring satisfactory wireless coverage to a given geographical area.

Figure 4A:
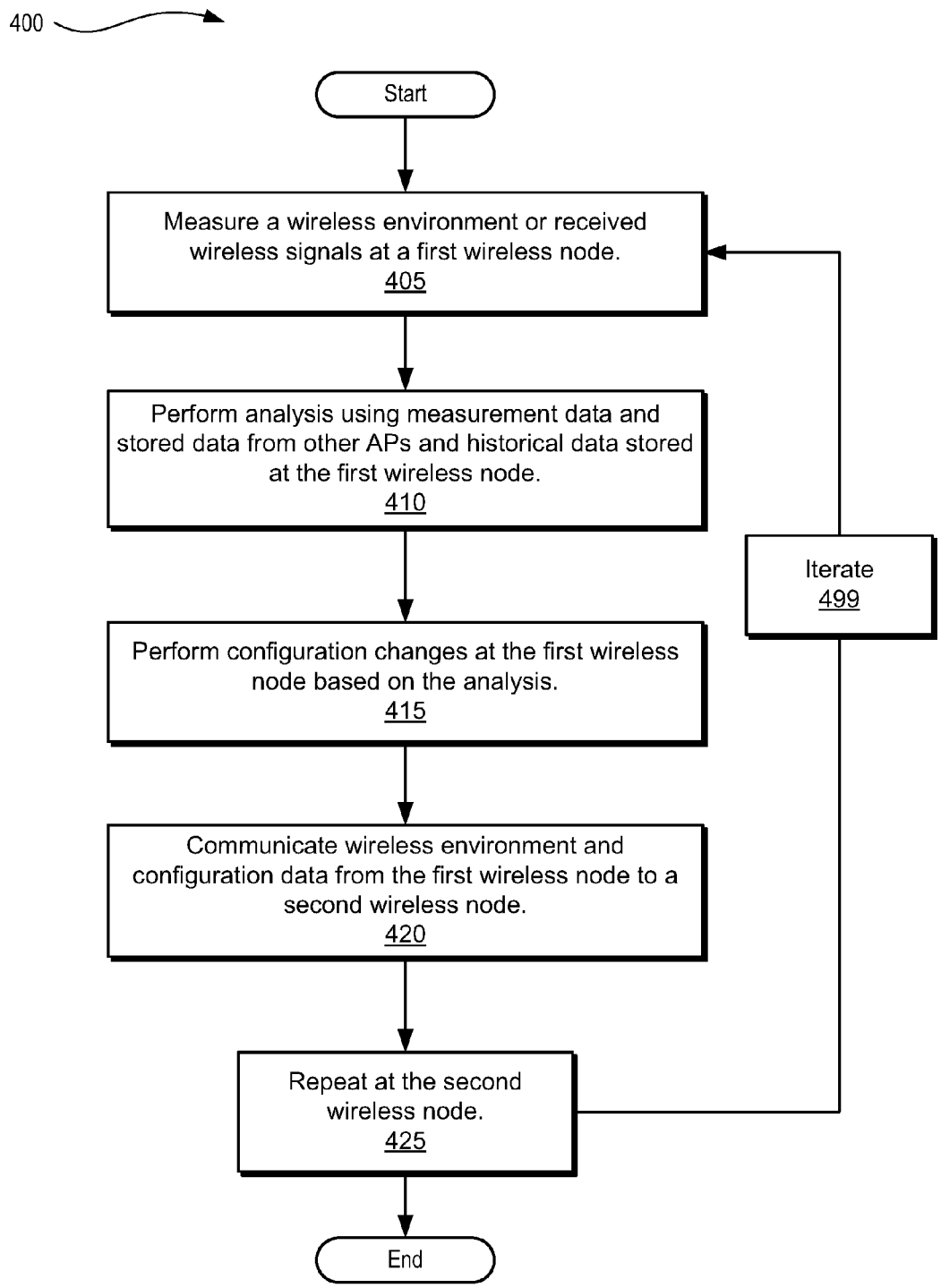
FIG. 4A is a flow diagram illustrating a method in accordance with the described embodiments.

FIG. 4A is a flow diagram illustrating a method 400 in accordance with the described embodiments.

Beginning at block 405, processing logic measures a wireless environment or received wireless signals at a first wireless node. For instance, the first wireless node may measure wireless parameters such as signal strength, interference, noise, error rates, retransmissions, etc.

At block 410, processing logic performs analysis using measurement data and stored data from other access points as well as historical data which is stored at the first wireless node. For instance, the first wireless node may perform such analysis to distill the information present in the measurement data, as well as information in data communicated from other wireless nodes. Such analysis may indicate that configuration parameters should be changed and how they should change, such as changing a channel assignment when there is high interference on the current channel as distilled from the data from other wireless nodes indicating low interference on other channels.

At block 415, processing logic performs configuration changes at the first wireless node based on the analysis. For instance, the first wireless node may alter its configuration by changing channel, changing transmit power, changing frame burst, changing RTS/CTS (Request to Send/Clear to Send) scheduling, changing associations, coding, modulation, and so forth.

At block 420, processing logic communicates wireless environment and configuration data from the first wireless node to a second wireless node. The nodes participating in the process may share a variety of metrics characterizing their respective wireless environments, such as noise, signal strength, different signals from different stations, or individual statistics available from performance counters such as the number of bytes from stations, number of errors, number of packets, and so forth. Data from other nodes might reveal configuration settings such as what channel another node presently uses, provide RTS/CTS protocol data, indicate whether another node is transmitting or receiving a lot of data or very little data, etc. Analysis of such data by the other nodes receiving such information may include a scan of the known wireless environments to determine if a particular channel has very little interference or scanning through the various channels to identify those channels which are more likely to result in interference, as well as analysis consistent with that described above for the first wireless node at block 410.

At block 425, processing logic repeats at the second wireless node. More particularly, processing logic at the second wireless node upon receiving the wireless environment and configuration data from the first wireless node then proceeds to repeat the operations of measuring, performing analysis, performing configuration changes, and communicating the wireless environment and configuration data at the second wireless node.

The operations of measuring, performing analysis, performing configuration changes, and communicating the wireless environment and configuration data may then be iterated via block 499 as needed, for instance, by the second wireless node performing the operations and communicating the wireless environment and configuration data back to the first wireless node or communicating such information to a third wireless node.

For instance, the first wireless node access point may measure its own environment and self re-configure based on those measurements or the first wireless node may receive measurements from other nodes, measure its own wireless environment, and then re-configure based on the available information. Either way, a fully distributed architecture results due to the ability for the nodes to re-configure based on measurements of their own and based additionally on the measurements shared by other wireless nodes.

In certain embodiments, the operations depicted at method 400 are used at each and every participating wireless node in each of multiple iterations implementing the distributed processing of the described system. After some number of iterations, the first node also repeats the processing starting again at block 405.

In an exemplary embodiment, each wireless node AP performs a channel optimization, and then passes all of its available state information to the next wireless node AP and this process then iterates at the next participating wireless node AP, and so on. For instance, refer to the data as set forth below at Table 1. In the example shown, all wireless node APs are within close radio range of each other, except for AP1 and AP4 which are separated. However, the example provides just a single exemplary embodiment. In practice, processing may communicate partial data, communicate data to multiple wireless node APs simultaneously, iterate in a different order, or optimize multiple wireless node APs simultaneously. Although a particular order is depicted at Table 1, no ordering is required whatsoever to practice the described embodiments. Any node may be a first node and any number of nodes may participate.

FIG. 4B provides a table 401 depicting the operational details of the exemplary embodiment depicted by the method 400 of FIG. 4A.

As can be seen by the table 401, initial data depicts that interference is locally measured as the level for each of the respective APs with blank entries of the table 401 representing unknown data. In the following section of the table 401, AP1 sends its information to AP2 and AP2 changes to channel 1. The APs then measure interference again. In the next section of the table 401, AP2 sends its information to AP3 and AP3 changes to channel 11. The APs then measure interference again. The APs continue to exchange information, but since all interference is low they don't change channels until a new external event occurs. After additional iterations, the data is distributed as depicted at the last and final section of the table 401.

FIG. 5 is a more detailed flow diagram illustrating a method 500 for implementing distributed wireless data sharing and control systems in accordance with described embodiments. Method 500 may be performed by processing logic that may include hardware (e.g., circuitry, dedicated logic, programmable logic, microcode, etc.), software (e.g., instructions run on a processing device to perform various operations such as interfacing functions, measuring, analyzing, communicating, configuring, collecting, receiving, modeling, quantifying, monitoring, estimating, selecting, assigning, configuring, diagnosing and executing/initiating algorithms, or some combination thereof in support of the described methodologies). In one embodiment, method 500 is performed at each of multiple wireless node access points such as those depicted at FIG. 1 (e.g., access points AP1 171, AP2 172, and AP3 173), performed by the wireless node access points as depicted at FIGS. 2A and 2B (e.g., APs 205A, 205B, 205C, 205D, 205E and core control APs 210A and 210B), performed by the wireless node access points as depicted at FIG. 3, performed by the wireless nodes 600 and 699 depicted at FIG. 6, and/or performed by the machine at element 700 of FIG. 7. Some of the blocks and/or operations listed below are optional in accordance with certain embodiments. The numbering of the blocks presented is for the sake of clarity and is not intended to prescribe an order of operations in which the various blocks must occur. Additionally, operations from method 500 may be utilized in a variety of combinations with any of the other process flows and their respective operations, including process flow 400 as set forth by FIG. 4A.

At block 505, processing logic enabled by a processor and a memory of a first wireless node collects measurements of a wireless environment at the first wireless node.

At block 510, processing logic determines a current configuration of the first wireless node.

At block 515, processing logic receives state information from a second wireless node, the received state information describing a configuration of the second wireless node and collected measurements of a wireless environment at the second wireless node.

At block 520, processing logic analyzes the collected measurements of the wireless environment at the first wireless node and the state information received from the second wireless node to determine one or more modifications to the current configuration of the first wireless node.

At block 525, processing logic adopts a modified configuration at the first wireless node by updating the current configuration of the first wireless node with the determined one or more modifications.

At block 530, processing logic communicates first node state information to the second wireless node, in which the first node state information describes the modified configuration adopted by the first wireless node and the collected measurements of the wireless environment at the first wireless node.

Processing may optionally iterate as necessary via block 599 by performing the same or similar operations at the first wireless node, at the second wireless node, or at any other wireless node participating in the implementation of the distributed wireless data sharing and control system as provided by method 500.

According to the described embodiments, "state information" measured, received, collected, or communicated between the wireless nodes may include, for example, configuration parameters, measurements of the wireless radio environment, as well as test diagnostics, status information, inventory data, and performance monitoring parameters (e.g., number of bytes from stations, number of errors, number of packets, channel data, RTS/CTS protocol data, data received, data transmitted, RSSI measurements, and so forth).

In accordance with another embodiment, method 500 further includes one or more of the following communication operations: (i) communicating the first node state information to the second wireless node simultaneously with communicating the first node state information to a plurality of other wireless nodes; (ii) broadcasting the first node state information to the second wireless node simultaneously while broadcasting the first node state information to the plurality of other wireless nodes; (iii) sending unsolicited transmissions having the first node state information therein to the second wireless node and to the plurality of other wireless nodes; (iv) communicating the first node state information directly to a third wireless node; (v) communicating the first node state information indirectly to a third wireless node through the second wireless node; and (vi) communicating the first node state information to a fourth wireless node and responsively receiving incoming state information from the fourth wireless node subsequent to communicating the first node state information to the fourth wireless node.

In accordance with another embodiment, method 500 further includes one or more of the following communication operations: (i) receiving second node state information from the second wireless node simultaneously with receiving additional state information from a plurality of other wireless nodes; (ii) receiving as part of a broadcast, the second node state information from the second wireless node concurrently with the plurality of other wireless nodes receiving the broadcast; (iii) receiving unsolicited transmissions from the second wireless node having the second node state information therein, the unsolicited transmissions being transmitted by the second wireless node to the first wireless node and to the plurality of other wireless nodes; (iv) receiving third node state information directly from a third wireless node; (v) receiving the third node state information indirectly from a third wireless node through the second wireless node; and (vi) receiving fourth node state information from a fourth wireless node subsequent to sending the first node state information to the fourth wireless node, in which the fourth node state information is sent by the fourth wireless node in reply to the first wireless node sending the first node state information.

According to another embodiment of method 500, the second wireless node is to analyze the first node state information communicated from the first wireless node and responsively: (i) determine, at the second wireless node, one or more modifications to a current configuration of the second wireless node; and (ii) adopt a modified configuration at the second wireless node by updating the current configuration of the second wireless node with the determined one or more modifications.

According to another embodiment of method 500, communicating the state information to the second wireless node includes communicating a plurality of configuration parameters active at the first wireless node and a plurality of wireless environment and performance metrics measured from the wireless radio environment at the first wireless node.

According to another embodiment of method 500, collecting the measurements of the wireless radio environment at the first wireless node further includes at least one of: identifying a change in the electromagnetic interference upon the first wireless node; identifying one or more interfering wireless nodes exhibiting electromagnetic interference upon the first wireless node; identifying a change in configuration of the one or more interfering wireless nodes; identifying a change in traffic levels of the one or more interfering wireless nodes; identifying a change in one or more performance metrics of the one or more interfering wireless nodes as measured by the first wireless node; and measuring link characteristics for one or more other wireless nodes communicatively linked with the first wireless node.

According to another embodiment of method 500, analyzing the collected measurements of the wireless radio environment at the first wireless node includes: determining a model of the first wireless node and a plurality of other wireless nodes including at least the second wireless node by: (i) modeling communicative relationships among the first wireless node and the other wireless nodes based at least in part on the collected measurements, and (ii) modeling an active state of the first wireless node representing the current configuration of the first wireless node having therein one or more configurable parameters for the first wireless node based at least in part on the collected measurements.

In accordance with another embodiment, method 500 further includes: quantifying a change in performance of the first wireless node or at least one of the plurality of the other wireless nodes based on a state change affecting the model, in which the state change includes at least one of: a change in the wireless transmission environment between the first wireless node and at least one of the plurality of other wireless nodes; a change in configuration of the first wireless node or at least one of the plurality of other wireless nodes; a change in traffic levels of the first wireless node or at least one of the plurality of other wireless nodes; and a change in one or more performance metrics measured by the first wireless node or at least one of the plurality of other wireless nodes.

According to another embodiment of method 500, modeling communicative relationships among the first wireless node and the plurality of other wireless nodes including at least the second wireless node includes: establishing nodes within the model representing communication links between any two or more wireless nodes including any of the first wireless node and the plurality of other wireless nodes; and establishing nodes within the model representing interference between any two or more of the first wireless node and any of the plurality of other wireless nodes.

According to another embodiment of method 500, analyzing the collected measurements of the wireless radio environment at the first wireless node to determine one or more modifications to the current configuration of the first wireless node includes: determining a model of a wireless network formed from the first wireless node and a plurality of other wireless nodes including at least the second wireless node; constructing a state space from the model that describes (i) the first wireless node and the plurality of other wireless nodes as device nodes and further describes (ii) transmission related parameter settings for each of the device nodes for the wireless radio environment within which the first wireless node and the plurality of other wireless nodes operate; and populating a set of transitions within the state space with allowable state transitions corresponding to possible changes to the transmission related parameter settings for each of the device nodes of the model, in which the allowable state transitions affect interactions between the device nodes within the wireless radio environment, the allowable state transitions denoted by a set of graph edges among the device nodes within the state space, the graph edges representative of at least interference and state relationships between the device nodes of the state space.

In accordance with another embodiment, method 500 further includes: optimizing performance of the wireless network formed from the first wireless node and a plurality of other wireless nodes by changing a profile of one or more of the device nodes in the state space to improve an overall performance metric that is a statistical function of the performance of the first wireless node and all of the identified one or more interfering nodes modeled; changing a profile of one or more of the device nodes in the state space to improve an overall performance metric according to a mathematical method of finding a fixed-point solution; and in which adopting the modified configuration at the first wireless node by updating the current configuration of the first wireless node with the determined one or more modifications includes adopting the changed profile from the state space for the first wireless node or communicating the changed profile from the state space to one or more of the other wireless nodes.

According to another embodiment of method 500, the first wireless node and a plurality of other wireless nodes including at least the second wireless node form a wireless network having hierarchical architecture; in which the first wireless node is a control Access Point (AP) wireless node; in which the plurality of other wireless nodes including at least the second wireless node are non-control AP wireless nodes; in which the control AP wireless node sends the state information to the plurality of other wireless nodes including at least the second wireless node as control AP state information and receives non-control AP state information from the plurality of other wireless nodes including at least the second wireless node; and in which the non-control AP wireless nodes receive the control AP state information from the control AP wireless node and return non-control AP state information to the control AP wireless node without distributing the non-control AP state information to other non-control AP wireless nodes.

For instance, in some wireless architectures, the wireless nodes may be categorized as being either access points (APs) or endpoints. An endpoint is often called a station (STA), user equipment (UE), a handset, or a host. An access point may be referred to as any one of: a WiFi access point, a WiFi repeater, a nodeB, an eNodeB, a WiFi compatible wireless gateway, a wireless in-home metering communication device, a wireless femtocell base station, a wireless small cell base station; a WiFi compatible base station, a wireless mobile device repeater, a wireless mobile device base station, an Ethernet connected wireless router, and an Ethernet connected wireless bridge. Moreover, in flat wireless architectures, such as mesh networks, a single device can function as both an access point and an endpoint concurrently.

According to another embodiment of method 500, the control AP wireless node designates one or more of the plurality of other wireless nodes as intermediate AP nodes; and in which the control AP wireless node communicates the state information to at least a subset of the plurality of other wireless nodes through the one or more designated intermediate AP nodes.

According to another embodiment of method 500, the first wireless node and a plurality of other wireless nodes including at least the second wireless node form a wireless network having flat architecture; in which the first wireless node and the plurality of other wireless nodes including at least the second wireless node are non-control Access Point (AP) wireless nodes, in which the wireless network operates in the absence of any control AP wireless node; and in which each non-control AP wireless node within the wireless network exchanges state information with the plurality of other wireless nodes.

According to another embodiment of method 500, each of the first wireless node and the second wireless node operate in conformity with a Network Functions Virtualization (NFV) compatible specification.

According to another embodiment of method 500, each of the first wireless node and the second wireless node are communicatively interfaced with a common wired backhaul; and in which communicating the state information to the second wireless node includes communicating the state information over the common wired backhaul and not via a wireless link.

According to another embodiment of method 500, the first wireless node and a plurality of other wireless nodes including at least the second wireless node form a wireless network; in which the common wired backhaul provides each of the first wireless node and the plurality of other wireless nodes with access to a broadband network or to a public Internet; and in which communicating the state information over the common wired backhaul and subsequent re-configuration reduces contention and interference within the wireless radio environment.

According to another embodiment of method 500, each of the first wireless node and the second wireless node are communicatively interfaced with a common wireless backhaul; and in which communicating the state information to the second wireless node includes communicating the state information over a wireless link established between the first wireless node and the second wireless node.

According to another embodiment of method 500, communicating the state information over the wireless link includes communicating the state information via a pre-determined common wireless channel accessible to any wireless node within a wireless network formed by the first wireless node and a plurality of other wireless nodes including at least the second wireless node.

In accordance with another embodiment, method 500 further includes: storing, at the first wireless node, the collected measurements of the wireless radio environment and the state information previously received from the second wireless node at the first wireless node as historical data; and analyzing the stored historical data with newly collected measurements of the wireless radio environment and newly received state information at the first wireless node to determine one or more modifications to the current configuration of the first wireless node during subsequent iterative processing at the first wireless node.

In accordance with another embodiment, method 500 further includes: performing parameter optimization and re-profiling for one or more wireless nodes within a wireless network formed by the first wireless node and a plurality of other wireless nodes including at least the second wireless node by iteratively repeating the collecting, the determining, the analyzing, the adopting, and the communicating at each of the plurality of wireless nodes according to a specified order; in which the specified order is selected from the following group: (i) an order defined by a round-robin ordering for the plurality of wireless nodes; (ii) an order defined at a separate remote application and communicated via management messages to the wireless nodes; (iii) an order defined by a sequence in which each of the plurality of wireless nodes joins the wireless network; (iv) a pre-determined order configured into each of the respective plurality of wireless nodes; (v) a seniority based order determined based on uptime for each of the respective plurality of wireless nodes; and (iv) a role based order determined based on each of the respective plurality of wireless nodes operating as one of a control access point (AP) node, a non-control AP node, or an intermediate AP node.

With parameter optimization and re-profiling a wireless node may try a first parameter to see if an improvement is made and then try another setting or parameter to determine if a further improvement is attained or not, and so on, through multiple available parameters and settings until a model is built up which can be used to identify which parameters and settings are preferable. Moreover, because state information is being shared, settings that result in a negative change to the performance of second wireless node when a first wireless node adopts a parameter change can be identified and avoided. Such processing can iteratively be applied to the wireless nodes of the network, and over time, the network will converge upon the most optimal settings for the network overall through the implementation of configuration changes at each of the individual wireless nodes.

For instance, parameter optimization and re-profiling is enabled by passing data messages amongst the wireless nodes in which each wireless node collects state information from other wireless nodes. Each wireless node then shares its own state information with the other wireless nodes. Each wireless node may broadcast its state information over a wired medium such as via the Internet, a LAN, or other hardwired channel or may instead communicate such information via a commonly accessible wireless channel available to the participating wireless nodes. The state information may include any or all of the following: transmit power, channel, location information, congestion factor, number of active local stations, station IDs of actively connected stations, station IDs of stations pending connection, average Signal-to-Noise Ratio (SNR or S/N), average or instantaneous throughput, or other relevant interference information. Congestion factor may be a measure indicating how congested the traffic going through a wireless node is as represented by, for example, a queue length or a ratio of offered load to throughput.

In such an embodiment, it may be that some, but not necessarily all wireless nodes perform parameter optimization and re-profiling because if a change occurs or affects only a portion of the network, there may be no reason whatsoever for some of the nodes to react to that change. For instance, it may be that only adjacent nodes to an affected node react and reconfigure themselves, while the greater majority of other nodes in a wireless network remain unaffected and as such require no such parameter optimization and re-profiling responsive to the change. Where a change affects only a portion of the nodes, the chosen ordering would likewise apply to only the nodes affected, specifically, those nodes undergoing parameter optimization and re-profiling responsive to a change.

According to another embodiment of method 500, each of the plurality of wireless nodes iteratively shares state its information according to its place in the specified order by communicating one or more of: transmit power of the respective wireless node of the respective wireless node; channel information for the respective wireless node; frequency band information for the respective wireless node; radio configuration parameters for the respective wireless node; geographic location information of the respective wireless node; congestion factor information of the respective wireless node; traffic level information of the respective wireless node; a quantity of active local stations interfaced with the respective wireless node; station IDs of actively connected stations to the respective wireless node; station IDs of stations pending connection to the respective wireless node; Signal-to-Noise Ratio (SNR) as measured at the respective wireless node; average throughput of the respective wireless node; instantaneous throughput of the respective wireless node; interference information determined by the respective wireless node; queue length information for the respective wireless node; and a ratio of offered load to throughput at the respective wireless node.

According to another embodiment of method 500, communicating state information further includes: sharing location information in the form of an absolute geographic location or a relative location based on received signal strength within a wireless network topology formed from the first wireless node and a plurality of other wireless nodes including at least the second wireless node.

There are a variety of ways in which to get location information. For instance, according to certain embodiments, the location information is derived utilizing one or more of triangulation relative to multiple of the other wireless nodes, triangulation relative to specified reference points; or determining via Global Positioning System (GPS) coordinates. Alternatively, such data may be entered by a system admin. Location information may also be three-dimensional (3D) to include elevation or floor info, and as such, triangularization does not mandate a two-dimensional (2D) configuration.

In accordance with another embodiment, method 500 further includes: implementing a self healing algorithm for a wireless network formed from the first wireless node and a plurality of other wireless nodes including at least the second wireless node; in which the self healing algorithm utilizes the state information exchanged between the wireless nodes of the wireless network to recover from a failure mode including one of the first or the second wireless nodes going off-line; and in which implementing the self healing algorithm includes each wireless node performing the following operations: (i) determining a failed wireless node based on the expected reception of state information for the failed wireless node exceeding a timeout, (ii) identifying a recovery wireless node distinct from the failed wireless node that is adjacent to the failed wireless node and is suitable for connection or association with wireless stations previously connected with the failed wireless node, and (iii) re-connecting or re-associating the wireless stations previously connected with the failed wireless node to the recovery wireless node and varying the wireless configuration at the recovery wireless node identified as being adjacent to the failed wireless node to compensate for the failed wireless node.

When a wireless node fails or goes off-line, state information from that wireless node will become obsolete. In order to track when a wireless node fails, a time stamp may accompany every message of state information transmitted from the wireless node such that it can be compared to a timeout later. Such a time stamp supports a timeout function that enables other wireless nodes receiving that state information to determine whether the transmitted state information is obsolete or not. Once such determination is made, adjacent wireless node APs or other nearby wireless node APs may increase their transmit powers to provide improved coverage and to compensate for the failed wireless node AP. Embodiments may use distance from a failed wireless node to identify adjacent wireless nodes. For instance, a wireless node having the shortest distance from the failed wireless node may be considered as the adjacent wireless node and can be used for failover, or multiple such wireless nodes determined to be nearby may be used for the purposes of failover.

For instance, re-associating to a different node and changing the transmit power may suffice as a self healing algorithm, however, other self healing algorithm operations may be utilized, such as re-associating and changing channel assignments. As such, varying the wireless configuration may correspond to a change in node or station association, a change in channel assignment at a given wireless node, a change in wireless transmit power for a particular wireless node, or some combination thereof.

In accordance with another embodiment, method 500 further includes: implementing an interference reduction algorithm for a wireless network formed from the first wireless node and a plurality of other wireless nodes including at least the second wireless node; in which the interference reduction algorithm utilizes the state information exchanged between the wireless nodes of the wireless network to improve performance and reduce mutual interference between the wireless nodes of the wireless network.

According to another embodiment of method 500, implementing the interference reduction algorithm includes each wireless node performing the following operations: calculating a level of interference received from other wireless nodes of the wireless network; determining a relative distance from the respective wireless node to each of the other wireless nodes causing interference; establishing a mutual transmit power back-off for the respective wireless node and one or more of the other wireless nodes; communicating the established mutual transmit power back-off to the one or more other wireless nodes; and adopting the established mutual transmit power back-off at the respective wireless node to minimize the mutual interference between the respective wireless node and the one or more other wireless nodes.

According to another embodiment of method 500, implementing the interference reduction algorithm includes each wireless node performing the following operations: analyzing the state information exchanged between the first wireless node and a plurality of other wireless nodes including at least the second wireless node to determine channel assignments for the first wireless node and the plurality of other wireless nodes; and changing channel assignments at one or more of the first wireless node and the plurality of other wireless nodes based on the analysis.

Implementing an interference reduction algorithm may include interference management methods by manipulating power control, associations, protocol limit parameters, or channel assignment. The interference reduction algorithm may also use the exchange and collection of state information to optimize and reduce the mutual interference between the wireless nodes. Using the collected state information, each wireless node can calculate and determine the level of interference received from other participating wireless node APs using the transmit power information. In pre-planned and well designed networks, adjacent wireless node APs are assigned different frequency channels (e.g., via a frequency re-use factor), and therefore wireless nodes operating on the same frequency channels are normally placed farther apart, thus reducing the amount of mutual interference. However, in many practical scenarios, such frequency allocations are at times assigned statically or randomly, and the wireless node APs are either not sufficiently distant from one another or very often have their transmit powers set at maximum, or both, which results in a wireless operational environment with significant signal overlap and detrimental interference.

Certain interference reduction algorithms may therefore first determine a level of interference at each respective wireless node of the network subsequent to which each respective wireless node notifies the other wireless nodes of its level of interference, such that all nodes may implement an appropriate power back-off to reduce the interference. Such a process may be repeated to optimize the transmit power and minimize the mutual interference between the wireless nodes. For example, each wireless node may back-off its transmit power by a pre-determined value, and if the level of mutual interference is acceptable, the wireless node would then keep that level of transmit power. However, if the level of interference remains high, the corresponding wireless node could back-off its transmit power further through subsequent iteration. A minimum transmit power level may also be established below which the quality of service from the wireless nodes to its stations would suffer, and as such, regardless of the number of iterations, a wireless node would not reduce its transmit power lower than that minimum transmit power level established for the wireless node. Moreover, should the minimum transmit power level be reached, then the service provider would be well advised to install a new wireless node AP, which would maintain the same level of power and therefore same level of interference, however would boost the coverage. This may be facilitated via notifications triggered by the wireless node implementing the interference reduction algorithm, for instance, by sending an SMS or email message to a user or administrator or by triggering an appropriate alert to an administrative configuration interface.

In accordance with another embodiment, method 500 further includes: implementing a load balancing algorithm for a wireless network formed from the first wireless node and a plurality of other wireless nodes including at least the second wireless node; in which the load balancing algorithm utilizes the state information exchanged between the wireless nodes of the wireless network to optimize distribution of bandwidth demand by stations connected with the plurality of wireless nodes within the wireless network and to reduce wireless traffic congestion at any of the plurality of wireless nodes of the wireless network.

According to another embodiment of method 500, implementing the load balancing algorithm includes each wireless node performing the following operations: comparing measurements collected for the respective wireless node to pre-determined thresholds and to corresponding measurements collected for the other wireless nodes of the wireless network and exchanged via state information between the plurality of wireless nodes of the wireless network; in which the comparing measurements includes one or more of: comparing instantaneous throughput of the respective wireless node with instantaneous throughput of one or more other wireless nodes; comparing average throughput of the respective wireless node with average of one or more other wireless nodes; comparing queue length of the respective wireless node with queue length of one or more other wireless nodes; comparing a quantity of active connections by stations with the respective wireless node with a quantity of active connections by stations with the one or more other wireless nodes; comparing delayed and dropped packets of the respective wireless node with delayed and dropped packets of one or more other wireless nodes; comparing an average Packet Error Rate (PER) against a threshold PER or average PER of one or more other wireless nodes; and triggering an offloading request to one or more of the other wireless nodes based on the comparing of the measurements.

The Packet Error Rate (PER) parameter in particular may be used by WiFi access points as an effective measure of performance. An acceptable PER is typically predefined at levels which corresponds to an acceptable BER (Bit Error Rate or Bit Error Ratio) for the wireless system.

According to another embodiment of method 500, implementing the load balancing algorithm further includes: disconnecting and re-connecting connected stations of the respective wireless node with another of the one or more other wireless access nodes responsive to the triggering of the offloading request.

Unlike Self Optimized Networks (SON) as implemented by Long Term Evolution (LTE or 4G) networks, embodiments herein can use a wired backhaul but do not require one. Rather, a WiFi interface from wireless node to wireless node may be utilized instead to control channels with such a feature being enabled by the shorter range communications in WiFi and the distributed coordination as described herein and due also to the longer timescale processing afforded by the relatively low mobility typical with WiFi wireless nodes.

The exchanges and collection of state information can be used to balance the traffic load across all wireless nodes, which in turn could also assist with reducing points of congestion. A congestion factor or any measure indicating the amount of traffic or load at a particular wireless node may be used to determine whether connections made to the wireless node need to be redirected to other wireless nodes based on a wireless node exceeding a threshold as well as a determination of which other nodes would be appropriate to assume responsibility for re-directed stations. Selection of a wireless node to assume responsibility of stations from an overloaded wireless node may be determined according to the following criteria: first, wireless nodes with closer distance to the overloaded wireless node are given priority, next, wireless nodes with less load are given priority, and finally, wireless nodes with higher transmit power are given priority. Because all wireless nodes have access to all the state information from all the wireless nodes of the wireless network, each wireless node is able to determine its own priority level. Therefore, in accordance with such an embodiment, the wireless node having highest priority level, given the above criteria will first assume the extra load. Stations will be disconnected from the overloaded wireless node and directed to reconnect to the new wireless node one by one.

In accordance with another embodiment, method 500 further includes: implementing a traffic congestion reduction algorithm for a wireless network formed from the first wireless node and a plurality of other wireless nodes including at least the second wireless node; in which the traffic congestion reduction algorithm utilizes the state information exchanged between the wireless nodes of the wireless network to reduce starvation of resources attributable to simultaneous requests for association from multiple stations requesting connections to a single one of the plurality of wireless nodes within the wireless network and to optimize distribution of the connections of stations with each of the plurality of nodes within the wireless network.

The exchanges and collection of state information may further be utilized to reduce network congestion or improve throughput for one or more troubled wireless nodes. In practice, even when sufficient wireless node APs are present, the presence of a large number of wireless stations which simultaneously attempt to get wireless access may result in congestion problems, potentially bringing down an entire wireless network due to the spiral effect of congestion. Once a few stations fail to connect to a single wireless node AP, the stations would next scan for new frequencies and attempt to connect to another wireless node AP with a different frequency. The simultaneous attempts for connection would then cause the new wireless node AP to potentially fail also as caused by collisions between the simultaneous requests for authentication from the stations, and so forth, potentially causing multiple wireless node APs to fail in the network. State information is therefore utilized to coordinate connectivity when simultaneous requests are pending causing the wireless network to experience congestion. Initial processing may default to addressing congestion through interference reduction as described previously so as to increase non-overlapping coverage areas for the wireless nodes. Thus, when the problem of congestion is detected, in a contrarian sense, the wireless network may be protected by reducing the coverage area of the wireless nodes making up the wireless network creating smaller coverage areas for the respective wireless nodes and in turn forcing the wireless stations to access different wireless node APs rather than attempting to simultaneously access, and potentially overwhelm, a single wireless node AP. Spatial, frequency, and time multiplexing may further be utilized to remedy network congestion issues in the wireless network.

According to a particular embodiment, there is a non-transitory computer readable storage medium having instructions stored thereon that, when executed by a processor of a first wireless node, the instructions cause the first wireless node to perform operations including: collecting measurements of a wireless environment at the first wireless node; determining a current configuration of the first wireless node; receiving state information from a second wireless node, the received state information describing a configuration of the second wireless node and collected measurements of a wireless environment at the second wireless node; analyzing the collected measurements of the wireless environment at the first wireless node and the state information received from the second wireless node to determine one or more modifications to the current configuration of the first wireless node; adopting a modified configuration at the first wireless node by updating the current configuration of the first wireless node with the determined one or more modifications; and communicating first node state information to the second wireless node, the first node state information describing the modified configuration adopted by the first wireless node and the collected measurements of the wireless environment at the first wireless node.

According to another embodiment, the instructions of the non-transitory computer readable storage media cause the first wireless node to further perform one or more of the communication operations, including: (i) communicating the first node state information to the second wireless node simultaneously with communicating the first node state information to a plurality of other wireless nodes; (ii) broadcasting the first node state information to the second wireless node simultaneously while broadcasting the first node state information to the plurality of other wireless nodes; (iii) sending unsolicited transmissions having the first node state information therein to the second wireless node and to the plurality of other wireless nodes; (iv) communicating the first node state information directly to a third wireless node; (v) communicating the first node state information indirectly to a third wireless node through the second wireless node; and (vi) communicating the first node state information to a fourth wireless node and responsively receiving incoming state information from the fourth wireless node subsequent to communicating the first node state information to the fourth wireless node.

According to another embodiment, the instructions of the non-transitory computer readable storage media cause the first wireless node to further perform one or more of the following algorithms: (i) a self healing algorithm for a wireless network formed from the first wireless node and a plurality of other wireless nodes including at least the second wireless node to compensate for a failed wireless node; (ii) an interference reduction algorithm for the wireless network to optimize and reduce mutual interference between the wireless nodes of the wireless network; (iii) a load balancing algorithm for the wireless network to optimize distribution of bandwidth demand by stations connected with the plurality of nodes within the wireless network and to reduce wireless traffic congestion at any of the plurality of wireless nodes of the wireless network; and (iv) a traffic congestion reduction algorithm for the wireless network to reduce starvation of resources attributable to simultaneous requests for association from multiple stations requesting connections to a single one of the plurality of wireless nodes within the wireless network and to optimize distribution of the connections of stations with each of the plurality of nodes within the wireless network.

In accordance with an alternative embodiment, there is a method at a wireless node network having a plurality of wireless nodes operating therein, each of the wireless nodes having at least a processor and a memory, in which the method includes: collecting first measurements of a wireless environment at a first wireless node; determining a current first node configuration for the first wireless node; analyzing the first measurements of the wireless environment collected at the first wireless node to determine one or more modifications to the current first node configuration for the first wireless node; adopting a modified first node configuration at the first wireless node by updating the current first node configuration of the first wireless node with the determined one or more modifications; communicating first state information to a second wireless node, the first state information describing the modified first node configuration adopted by the first wireless node and the first measurements of the wireless environment collected at the first wireless node; receiving the first state information at the second wireless node; collecting second measurements of the wireless environment at a second wireless node; determining a current second node configuration for the second wireless node; analyzing the received state information and the second measurements of the wireless environment collected at the second wireless node to determine one or more modifications to the current second node configuration for the second wireless node; adopting a modified second node configuration at the second wireless node by updating the current second node configuration of the second wireless node with the determined one or more modifications for the second wireless node; and communicating second state information to the first wireless node, the second state information describing the modified second node configuration adopted by the second wireless node and the second measurements of the wireless environment collected at the second wireless node. In accordance with such an embodiment, communicating the first state information may further include: communicating the first state information from the first wireless node to a first plurality of wireless nodes including at least the second wireless node; and communicating second state information may further include communicating the second state information from the second wireless node to a second plurality of wireless nodes including at least the first wireless node.

Figure 6:
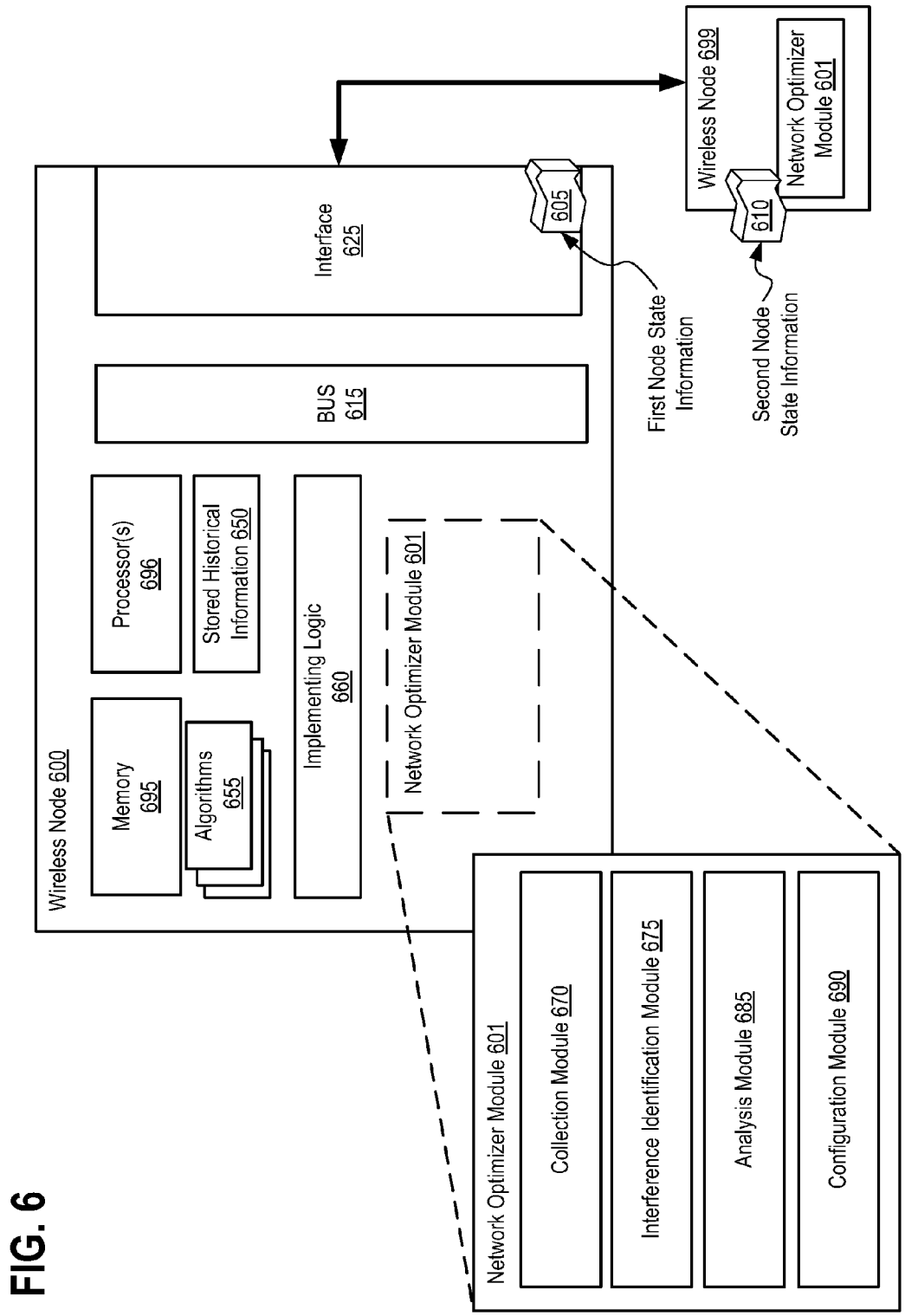
FIG. 6 illustrates a diagrammatic representation of a wireless node in accordance with which embodiments may operate, be installed, integrated, or configured.

FIG. 6 illustrates a diagrammatic representation of a wireless node 600 in accordance with which embodiments may operate, be installed, integrated, or configured.

In one embodiment, wireless node 600 includes a memory 695 and a processor or processors 696. For example, memory 695 may store instructions to be executed and processor(s) 696 may execute such instructions. Processor(s) 696 may also implement or execute implementing logic 660 having logic to implement the methodologies discussed herein. Wireless node 600 includes communication bus(es) 615 to transfer transactions, instructions, configuration parameters, state information, and other data within wireless node 600 among a plurality of peripheral devices communicably interfaced with one or more communication buses 615. Wireless node 600 further includes interface 625, for example, to send and receive state information, to collect measurements of the wireless environment within which the wireless node 600 operates, to receive requests, return responses, and otherwise interface with network elements located separately from the wireless node 600.

In some embodiments, interface 625 communicates state information via a WiFi interface on a common channel between wireless nodes. In other embodiments a wired backhaul is used.

Stored historical information 650 collected by wireless node 600 or received from other wireless nodes may be stored upon a hard drive, a persistent data store, a database, or other storage location within wireless node 600.

Distinct within wireless node 600 is network optimizer module 601 which includes collection module 670, interference identification module 675, analysis module 685, and configuration module 690. Network optimizer module 601 may be installed and configured in a compatible wireless node 600 as is depicted by FIG. 6, or provided separately so as to operate in conjunction with appropriate implementing logic 660 or other software.

In accordance with one embodiment there is a first wireless node 600 having a processor 696 and a memory 695 therein, in which the first wireless node 600 further includes: a collection module 670 to collect measurements of a wireless environment at the first wireless node; an analysis module 685 to determine a current configuration of the first wireless node; an interface 625 to receive state information from a second wireless node 699, the received state information describing a configuration of the second wireless node 699 and collected measurements of a wireless environment at the second wireless node 699; the analysis module 685 to further analyze the collected measurements of the wireless environment at the first wireless node 600 and the state information received from the second wireless node 699 to determine one or more modifications to the current configuration of the first wireless node; a configuration module 690 to adopt a modified configuration at the first wireless node 600 by updating the current configuration of the first wireless node 600 with the determined one or more modifications; and the interface 625 to further communicate first node state information 605 to the second wireless node 699, the first node state information 605 describing the modified configuration adopted by the first wireless node 600 and the collected measurements of the wireless environment at the first wireless node 600. The first node state information 605 and state information from other wireless nodes, including the second wireless node 699 may be retained by the first wireless node 600 as stored historical information 650.

In accordance with another embodiment, the wireless node 600 further includes: an interference identification module 675 to identify one or more interfering wireless nodes (e.g., such as the second wireless node 699) within a wireless network formed from the first wireless node 600 and a plurality of other wireless nodes including at least the second wireless node 699, the one or more interfering wireless nodes exhibiting electromagnetic interference upon the first wireless node; and in which the interference identification module 675 is to further implement one or more of the following algorithms 655: a self healing algorithm for the wireless network to compensate for a failed wireless node; an interference reduction algorithm for the wireless network to optimize and reduce mutual interference between the first wireless node and the one or more interfering wireless nodes of the wireless network; a load balancing algorithm to optimize distribution of bandwidth demand by stations connected with the wireless network and to reduce wireless traffic congestion at any of the plurality of wireless nodes of the wireless network; and a traffic congestion reduction algorithm for the wireless network to reduce starvation of resources attributable to simultaneous requests for association from multiple stations requesting connections to a single one of the plurality of wireless nodes within the wireless network and to optimize distribution of the connections of stations with each of the plurality of nodes within the wireless network.

According to the embodiment depicted here, the second wireless node 699 also includes a network optimizer module 601 and as such, may provide identical functionality as that described with reference to the first wireless node 600 as well as operate cooperatively with first wireless node 600. For instance, the second wireless node 699 receives the first node state information 605 from the first wireless node 600 and communicates second node state information 610 to the first wireless node 600 in accordance with described embodiments.

FIG. 7 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a fully distributed wireless node access point, as a core control wireless node in a hierarchal architecture or a subordinate wireless node access point, or as a peer node in a peer-to-peer (or distributed) network environment. Certain embodiments of the machine may be in the form of a personal computer (PC), a server, a wireless network router, wireless switch or wireless bridge, wireless computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and persistent data base implementations), which communicate with each other via a bus 730. Main memory 704 includes information and instructions and software program components necessary for performing and executing the functions with respect to the various embodiments of the systems, methods, and the network optimizer module 734 as described herein. Algorithms 723 may be triggered based on, for example, analysis of collected measurements of a wireless environment, received state information, known access point statistics, known network equipment/access point capabilities and limitations, and so forth. Stored historical information 724 may be kept within main memory 704 for use in estimating and predicting operational characteristics of wireless system and environment undergoing evaluation. Algorithms 723 may be stored within main memory 704 for use when required or triggered by processing logic 726 and as determined by the network optimizer module 734. Main memory 704 and its sub-elements (e.g. 723 and 724) are operable in conjunction with processing logic 726 and/or software 722 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include one or more network interface cards 708 to communicatively interface the computer system 700 with one or more networks 720 from which information may be collected for analysis. For instance, network interface card 708 permits the computer system 700 to communicate via a WiFi interface to other wireless nodes or via a wired backhaul as necessary. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.). The computer system 700 may perform the functions of an network optimizer module 734 capable of interfacing with other wireless node access points to be optimized collectively as part of a wireless network, as well as modeling, monitoring, collecting, analyzing, reporting information, and initiating, triggering, and executing various algorithms 723 including the execution of commands and instructions to alter characteristics and operation of a wireless node access point pursuant to such algorithms 723, etc.

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. Software 722 may additionally or alternatively reside within main memory 704, and may further reside completely or at least partially within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprises:
   collecting measurements of a wireless environment at a first wireless node having at least a processor and a memory;
   determining a current configuration of the first wireless node;
   receiving state information from a second wireless node, the received state information describing a configuration of the second wireless node and collected measurements of a wireless environment at the second wireless node;
   analyzing the collected measurements of the wireless environment at the first wireless node and the state information received from the second wireless node to determine one or more modifications to the current configuration of the first wireless node;
   adopting a modified configuration at the first wireless node by updating the current configuration of the first wireless node with the determined one or more modifications;
   communicating first node state information to the second wireless node, the first node state information describing the modified configuration adopted by the first wireless node and the collected measurements of the wireless environment at the first wireless node, and
   performing parameter optimization and re-profiling for one or more wireless nodes within a wireless network formed by the first wireless node and a plurality of other wireless nodes including at least the second wireless node by iteratively repeating the collecting, the determining, the analyzing, the adopting, and the communicating at each of the plurality of wireless nodes are implemented according to a specified order.

2. The method of claim 1, further comprising one or more of the communication operations, comprising:
   communicating the first node state information to the second wireless node simultaneously with communicating the first node state information to a plurality of other wireless nodes;
   broadcasting the first node state information to the second wireless node simultaneously while broadcasting the first node state information to the plurality of other wireless nodes;
   sending unsolicited transmissions having the first node state information therein to the second wireless node and to the plurality of other wireless nodes;
   communicating the first node state information directly to a third wireless node;
   communicating the first node state information indirectly to a third wireless node through the second wireless node; and
   communicating the first node state information to a fourth wireless node and responsively receiving incoming state information from the fourth wireless node subsequent to communicating the first node state information to the fourth wireless node.

3. The method of claim 1, further comprising one or more of the communication operations, comprising:
   receiving second node state information from the second wireless node simultaneously with receiving additional state information from a plurality of other wireless nodes;
   receiving as part of a broadcast, the second node state information from the second wireless node concurrently with the plurality of other wireless nodes receiving the broadcast;
   receiving unsolicited transmissions from the second wireless node having the second node state information therein, the unsolicited transmissions being transmitted by the second wireless node to the first wireless node and to the plurality of other wireless nodes;
   receiving third node state information directly from a third wireless node;

receiving the third node state information indirectly from a third wireless node through the second wireless node; and receiving fourth node state information from a fourth wireless node subsequent to sending the first node state information to the fourth wireless node, wherein the fourth node state information is sent by the fourth wireless node in reply to the first wireless node sending the first node state information.

4. The method of claim 1:
wherein the second wireless node is to analyze the first node state information communicated from the first wireless node and responsively (i) determine, at the second wireless node, one or more modifications to a current configuration of the second wireless node and (ii) adopt a modified configuration at the second wireless node by updating the current configuration of the second wireless node with the determined one or more modifications.

5. The method of claim 1, wherein communicating the state information to the second wireless node comprises communicating a plurality of configuration parameters active at the first wireless node and a plurality of wireless environment and performance metrics measured from the wireless radio environment at the first wireless node.

6. The method of claim 1, wherein collecting the measurements of the wireless radio environment at the first wireless node further comprises at least one of:
identifying a change in the electromagnetic interference upon the first wireless node;
identifying one or more interfering wireless nodes exhibiting electromagnetic interference upon the first wireless node;
identifying a change in configuration of the one or more interfering wireless nodes;
identifying a change in traffic levels of the one or more interfering wireless nodes;
identifying a change in one or more performance metrics of the one or more interfering wireless nodes as measured by the first wireless node; and
measuring link characteristics for one or more other wireless nodes communicatively linked with the first wireless node.

7. The method of claim 1, wherein analyzing the collected measurements of the wireless radio environment at the first wireless node comprises:
determining a model of the first wireless node and a plurality of other wireless nodes including at least the second wireless node by:
(i) modeling communicative relationships among the first wireless node and the other wireless nodes based at least in part on the collected measurements, and
(ii) modeling an active state of the first wireless node representing the current configuration of the first wireless node having therein one or more configurable parameters for the first wireless node based at least in part on the collected measurements.

8. The method of claim 7, further comprising: quantifying a change in performance of the first wireless node or at least one of the plurality of the other wireless nodes based on a state change affecting the model, wherein the state change comprises at least one of:
a change in the wireless transmission environment between the first wireless node and at least one of the plurality of other wireless nodes;
a change in configuration of the first wireless node or at least one of the plurality of other wireless nodes;
a change in traffic levels of the first wireless node or at least one of the plurality of other wireless nodes; and
a change in one or more performance metrics measured by the first wireless node or at least one of the plurality of other wireless nodes.

9. The method of claim 7, wherein modeling communicative relationships among the first wireless node and the plurality of other wireless nodes including at least the second wireless node comprises:
establishing nodes within the model representing communication links between any two or more wireless nodes including any of the first wireless node and the plurality of other wireless nodes; and
establishing nodes within the model representing interference between any two or more of the first wireless node and any of the plurality of other wireless nodes.

10. The method of claim 1, wherein analyzing the collected measurements of the wireless radio environment at the first wireless node to determine one or more modifications to the current configuration of the first wireless node, comprises:
determining a model of a wireless network formed from the first wireless node and a plurality of other wireless nodes including at least the second wireless node;
constructing a state space from the model that describes (i) the first wireless node and the plurality of other wireless nodes as device nodes and further describes (ii) transmission related parameter settings for each of the device nodes for the wireless radio environment within which the first wireless node and the plurality of other wireless nodes operate; and
populating a set of transitions within the state space with allowable state transitions corresponding to possible changes to the transmission related parameter settings for each of the device nodes of the model, wherein the allowable state transitions affect interactions between the device nodes within the wireless radio environment, the allowable state transitions denoted by a set of graph edges among the device nodes within the state space, the graph edges representative of at least interference and state relationships between the device nodes of the state space.

11. The method of claim 10, further comprising:
optimizing performance of the wireless network formed from the first wireless node and a plurality of other wireless nodes by changing a profile of one or more of the device nodes in the state space to improve an overall performance metric that is a statistical function of the performance of the first wireless node and all of the identified one or more interfering nodes modeled;
changing a profile of one or more of the device nodes in the state space to improve an overall performance metric according to a mathematical method of finding a fixed-point solution; and
wherein adopting the modified configuration at the first wireless node by updating the current configuration of the first wireless node with the determined one or more modifications comprises adopting the changed profile from the state space for the first wireless node or communicating the changed profile from the state space to one or more of the other wireless nodes.

12. The method of claim 1:
wherein the first wireless node and a plurality of other wireless nodes including at least the second wireless node form a wireless network having hierarchical architecture;

wherein the first wireless node is a control Access Point (AP) wireless node;

wherein the plurality of other wireless nodes including at least the second wireless node are non-control AP wireless nodes;

wherein the control AP wireless node sends the state information to the plurality of other wireless nodes including at least the second wireless node as control AP state information and receives non-control AP state information from the plurality of other wireless nodes including at least the second wireless node; and wherein the non-control AP wireless nodes receive the control AP state information from the control AP wireless node and return non-control AP state information to the control AP wireless node without distributing the non-control AP state information to other non-control AP wireless nodes.

13. The method of claim 12:

wherein the control AP wireless node designates one or more of the plurality of other wireless nodes as intermediate AP nodes; and wherein the control AP wireless node communicates the state information to at least a subset of the plurality of other wireless nodes through the one or more designated intermediate AP nodes.

14. The method of claim 1:

wherein the first wireless node and a plurality of other wireless nodes including at least the second wireless node form a wireless network having flat architecture;

wherein the first wireless node and the plurality of other wireless nodes including at least the second wireless node are non-control Access Point (AP) wireless nodes, wherein the wireless network operates in the absence of any control AP wireless node; and wherein each non-control AP wireless node within the wireless network exchanges state information with the plurality of other wireless nodes.

15. The method of claim 1, wherein each of the first wireless node and the second wireless node operate in conformity with a Network Functions Virtualization (NFV) compatible specification.

16. The method of claim 1:

wherein each of the first wireless node and the second wireless node are communicatively interfaced with a common wired backhaul; and wherein communicating the state information to the second wireless node comprises communicating the state information over the common wired backhaul and not via a wireless link.

17. The method of claim 16:

wherein the first wireless node and a plurality of other wireless nodes including at least the second wireless node form a wireless network;

wherein the common wired backhaul provides each of the first wireless node and the plurality of other wireless nodes with access to a broadband network or to a public Internet; and wherein communicating the state information over the common wired backhaul and subsequent re-configuration reduces contention and interference within the wireless radio environment.

18. The method of claim 1:

wherein each of the first wireless node and the second wireless node are communicatively interfaced with a common wireless backhaul; and wherein communicating the state information to the second wireless node comprises communicating the state information over a wireless link established between the first wireless node and the second wireless node.

19. The method of claim 18, wherein communicating the state information over the wireless link comprises communicating the state information via a pre-determined common wireless channel accessible to any wireless node within a wireless network formed by the first wireless node and a plurality of other wireless nodes including at least the second wireless node.

20. The method of claim 1, further comprising:

storing, at the first wireless node, the collected measurements of the wireless radio environment and the state information previously received from the second wireless node at the first wireless node as historical data; and analyzing the stored historical data with newly collected measurements of the wireless radio environment and newly received state information at the first wireless node to determine one or more modifications to the current configuration of the first wireless node during subsequent iterative processing at the first wireless node.

21. The method of claim 1:

wherein the specified order is selected from a group, the group comprising:

an order defined by a round-robin ordering for the plurality of wireless nodes;

an order defined at a separate remote application and communicated via management messages to the wireless nodes;

an order defined by a sequence in which each of the plurality of wireless nodes joins the wireless network;

a pre-determined order configured into each of the respective plurality of wireless nodes;

a seniority based order determined based on uptime for each of the respective plurality of wireless nodes; and a role based order determined based on each of the respective plurality of wireless nodes operating as one of a control access point (AP) node, a non-control AP node, or an intermediate AP node.

22. The method of claim 21, wherein each of the plurality of wireless nodes iteratively shares state its information according to its place in the specified order by communicating one or more of:

transmit power of the respective wireless node of the respective wireless node;

channel information for the respective wireless node;

frequency band information for the respective wireless node;

radio configuration parameters for the respective wireless node;

geographic location information of the respective wireless node;

congestion factor information of the respective wireless node;

traffic level information of the respective wireless node;

a quantity of active local stations interfaced with the respective wireless node;

station IDs of actively connected stations to the respective wireless node;

station IDs of stations pending connection to the respective wireless node;

Signal-to-Noise Ratio (SNR) as measured at the respective wireless node;

average throughput of the respective wireless node;

instantaneous throughput of the respective wireless node;
interference information determined by the respective wireless node;
queue length information for the respective wireless node; and
a ratio of offered load to throughput at the respective wireless node.

23. The method of claim 1, wherein communicating state information further comprises:
sharing location information in the form of an absolute geographic location or a relative location based on received signal strength within a wireless network topology formed from the first wireless node and a plurality of other wireless nodes including at least the second wireless node.

24. The method of claim 1, further comprising:
implementing a self healing algorithm for a wireless network formed from the first wireless node and a plurality of other wireless nodes including at least the second wireless node;
wherein the self healing algorithm utilizes the state information exchanged between the wireless nodes of the wireless network to recover from a failure mode including one of the first or the second wireless nodes going off-line; and
wherein implementing the self healing algorithm comprises each wireless node performing the following operations:
(i) determining a failed wireless node based on the expected reception of state information for the failed wireless node exceeding a timeout,
(ii) identifying a recovery wireless node distinct from the failed wireless node that is adjacent to the failed wireless node and is suitable for connection or association with wireless stations previously connected with the failed wireless node, and
(iii) re-connecting or re-associating the wireless stations previously connected with the failed wireless node to the recovery wireless node and varying the wireless configuration at the recovery wireless node identified as being adjacent to the failed wireless node to compensate for the failed wireless node.

25. The method of claim 1, further comprising:
implementing an interference reduction algorithm for a wireless network formed from the first wireless node and a plurality of other wireless nodes including at least the second wireless node;
wherein the interference reduction algorithm utilizes the state information exchanged between the wireless nodes of the wireless network to improve performance and reduce mutual interference between the wireless nodes of the wireless network.

26. The method of claim 25, wherein implementing the interference reduction algorithm comprises each wireless node performing the following operations:
calculating a level of interference received from other wireless nodes of the wireless network;
determining a relative distance from the respective wireless node to each of the other wireless nodes causing interference;
establishing a mutual transmit power back-off for the respective wireless node and one or more of the other wireless nodes;
communicating the established mutual transmit power back-off to the one or more other wireless nodes; and
adopting the established mutual transmit power back-off at the respective wireless node to minimize the mutual interference between the respective wireless node and the one or more other wireless nodes.

27. The method of claim 25, wherein implementing the interference reduction algorithm comprises each wireless node performing the following operations:
analyzing the state information exchanged between the first wireless node and a plurality of other wireless nodes including at least the second wireless node to determine channel assignments for the first wireless node and the plurality of other wireless nodes; and
changing channel assignments at one or more of the first wireless node and the plurality of other wireless nodes based on the analysis.

28. The method of claim 1, further comprising:
implementing a load balancing algorithm for a wireless network formed from the first wireless node and a plurality of other wireless nodes including at least the second wireless node;
wherein the load balancing algorithm utilizes the state information exchanged between the wireless nodes of the wireless network to optimize distribution of bandwidth demand by stations connected with the plurality of wireless nodes within the wireless network and to reduce wireless traffic congestion at any of the plurality of wireless nodes of the wireless network.

29. The method of claim 28, wherein implementing the load balancing algorithm comprises each wireless node performing the following operations:
comparing measurements collected for the respective wireless node to pre-determined thresholds and to corresponding measurements collected for the other wireless nodes of the wireless network and exchanged via state information between the plurality of wireless nodes of the wireless network;
wherein the comparing measurements comprises one or more of:
comparing instantaneous throughput of the respective wireless node with instantaneous throughput of one or more other wireless nodes;
comparing average throughput of the respective wireless node with average of one or more other wireless nodes;
comparing queue length of the respective wireless node with queue length of one or more other wireless nodes;
comparing a quantity of active connections by stations with the respective wireless node with a quantity of active connections by stations with the one or more other wireless nodes;
comparing delayed and dropped packets of the respective wireless node with delayed and dropped packets of one or more other wireless nodes;
comparing an average Packet Error Rate (PER) against a threshold PER or average PER of one or more other wireless nodes; and
triggering an offloading request to one or more of the other wireless nodes based on the comparing of the measurements.

30. The method of claim 29, wherein implementing the load balancing algorithm further comprises:
disconnecting and re-connecting connected stations of the respective wireless node with another of the one or more other wireless access nodes responsive to the triggering of the offloading request.

31. The method of claim 1, further comprising:

implementing a traffic congestion reduction algorithm for a wireless network formed from the first wireless node and a plurality of other wireless nodes including at least the second wireless node;

wherein the traffic congestion reduction algorithm utilizes the state information exchanged between the wireless nodes of the wireless network to reduce starvation of resources attributable to simultaneous requests for association from multiple stations requesting connections to a single one of the plurality of wireless nodes within the wireless network and to optimize distribution of the connections of stations with each of the plurality of nodes within the wireless network.

32. Non-transitory computer readable storage medium having instructions stored thereon that, when executed by a processor of a first wireless node, the instructions cause the first wireless node to perform operations including:

collecting measurements of a wireless environment at the first wireless node;

determining a current configuration of the first wireless node;

receiving state information from a second wireless node, the received state information describing a configuration of the second wireless node and collected measurements of a wireless environment at the second wireless node;

analyzing the collected measurements of the wireless environment at the first wireless node and the state information received from the second wireless node to determine one or more modifications to the current configuration of the first wireless node, the analyzing the collected measurements comprising determining a model of the first wireless node and a plurality of other wireless nodes including at least the second wireless node by:
 (i) modeling communicative relationships among the first wireless node and the other wireless nodes based at least in part on the collected measurements, and
 (ii) modeling an active state of the first wireless node representing the current configuration of the first wireless node having therein one or more configurable parameters for the first wireless node based at least in part on the collected measurements;

adopting a modified configuration at the first wireless node by updating the current configuration of the first wireless node with the determined one or more modifications; and communicating first node state information to the second wireless node, the first node state information describing the modified configuration adopted by the first wireless node and the collected measurements of the wireless environment at the first wireless node.

33. The non-transitory computer readable storage media of claim 32, wherein the instructions cause the first wireless node to further perform one or more of the communication operations, comprising:

communicating the first node state information to the second wireless node simultaneously with communicating the first node state information to a plurality of other wireless nodes;

broadcasting the first node state information to the second wireless node simultaneously while broadcasting the first node state information to the plurality of other wireless nodes;

sending unsolicited transmissions having the first node state information therein to the second wireless node and to the plurality of other wireless nodes;

communicating the first node state information directly to a third wireless node;

communicating the first node state information indirectly to a third wireless node through the second wireless node; and communicating the first node state information to a fourth wireless node and responsively receiving incoming state information from the fourth wireless node subsequent to communicating the first node state information to the fourth wireless node.

34. The non-transitory computer readable storage media of claim 32, wherein the instructions cause the first wireless node to further perform one or more of the following algorithms:

performing a self healing algorithm for a wireless network formed from the first wireless node and a plurality of other wireless nodes including at least the second wireless node to compensate for a failed wireless node;

performing an interference reduction algorithm for the wireless network to optimize and reduce mutual interference between the wireless nodes of the wireless network;

performing a load balancing algorithm for the wireless network to optimize distribution of bandwidth demand by stations connected with the plurality of nodes within the wireless network and to reduce wireless traffic congestion at any of the plurality of wireless nodes of the wireless network; and performing a traffic congestion reduction algorithm for the wireless network to reduce starvation of resources attributable to simultaneous requests for association from multiple stations requesting connections to a single one of the plurality of wireless nodes within the wireless network and to optimize distribution of the connections of stations with each of the plurality of nodes within the wireless network.

35. A first wireless node, comprising:

a processor;

a memory;

a collection module to collect measurements of a wireless environment at the first wireless node;

an analysis module to determine a current configuration of the first wireless node;

an interface to receive state information from a second wireless node, the received state information describing a configuration of the second wireless node and collected measurements of a wireless environment at the second wireless node;

the analysis module to further analyze the collected measurements of the wireless environment at the first wireless node and the state information received from the second wireless node to determine one or more modifications to the current configuration of the first wireless node, the analyzing the collected measurements comprising determining a model of the first wireless node and a plurality of other wireless nodes including at least the second wireless node by:
 (i) modeling communicative relationships among the first wireless node and the other wireless nodes based at least in part on the collected measurements, and
 (ii) modeling an active state of the first wireless node representing the current configuration of the first wireless node having therein one or more configurable parameters for the first wireless node based at least in part on the collected measurements;

a configuration module to adopt a modified configuration at the first wireless node by updating the current configuration of the first wireless node with the determined one or more modifications; and the interface to further communicate first node state information to the second wireless node, the first node state information describing the modified configuration adopted by the first wireless node and the collected measurements of the wireless environment at the first wireless node.

36. The first wireless node of claim 35, further comprising:

an interference identification module to identify one or more interfering wireless nodes within a wireless network formed from the first wireless node and a plurality of other wireless nodes including at least the second wireless node, the one or more interfering wireless nodes exhibiting electromagnetic interference upon the first wireless node; and wherein the interference identification module is to further implement one or more of the following algorithms:

a self healing algorithm for the wireless network to compensate for a failed wireless node;

an interference reduction algorithm for the wireless network to optimize and reduce mutual interference between the first wireless node and the one or more interfering wireless nodes of the wireless network;

a load balancing algorithm to optimize distribution of bandwidth demand by stations connected with the wireless network and to reduce wireless traffic congestion at any of the plurality of wireless nodes of the wireless network; and a traffic congestion reduction algorithm for the wireless network to reduce starvation of resources attributable to simultaneous requests for association from multiple stations requesting connections to a single one of the plurality of wireless nodes within the wireless network and to optimize distribution of the connections of stations with each of the plurality of nodes within the wireless network.

* * * * *